(12) United States Patent
Mishra et al.

(10) Patent No.: US 8,086,344 B1
(45) Date of Patent: Dec. 27, 2011

(54) PREDICTIVE ROUTER FOR MATERIALS HANDLING

(75) Inventors: Devesh Mishra, Issaquah, WA (US); Eric Young, Mercer Island, WA (US); Irina M. Somin, Bellevue, WA (US); Hong Tian, Seattle, WA (US); Riyadth F. Al-Kazily, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 738 days.

(21) Appl. No.: 12/132,824

(22) Filed: Jun. 4, 2008

(51) Int. Cl.
*G06F 7/00* (2006.01)
*G06G 7/00* (2006.01)
*G06Q 10/00* (2006.01)

(52) U.S. Cl. ........ 700/216; 700/214; 700/215; 700/219; 700/224; 700/253; 705/400; 705/28

(58) Field of Classification Search .................. None
See application file for complete search history.

(56) References Cited

U.S. PATENT DOCUMENTS

| | | |
|---|---|---|
| 2003/0074250 A1 | 4/2003 | Burk |
| 2003/0149644 A1* | 8/2003 | Stingel et al. ................ 705/28 |
| 2008/0215179 A1 | 9/2008 | Yair et al. |
| 2009/0074545 A1 | 3/2009 | Lert et al. |

* cited by examiner

*Primary Examiner* — Gene Crawford
*Assistant Examiner* — Yolanda Cumbess
(74) *Attorney, Agent, or Firm* — Robert C. Kowert; Meyertons, Hood, Kivlin, Kowert & Goetzel, P.C.

(57) ABSTRACT

Systems and computer-implemented methods for predictive routing of item packages within a materials handling facility are disclosed. A predictive router may operate in conjunction with a container recommender, and both may be components of a facility management system. The predictive router may determine a routing destination for an item package dependent, at least in part, on the size and/or dimensions of a container that was recommended for handling the item package. The routing destination may be a shipping line customized for preparation of packed boxes of a particular size or in a particular size range for shipment. An optional scanner may attempt to determine the size of the actual container being used to ship the item package, and the predictive router may update the routing destination if the actual container does not match the recommended container. The predictive router may also consider special handling instructions when determining a routing destination.

37 Claims, 7 Drawing Sheets

PREDICTIVE ROUTER FOR MATERIALS HANDLING

BACKGROUND

Many companies package groups of items together for a variety of purposes, such as e-commerce and mail order companies that package items (e.g., books, CDs, apparel, food, etc.) to be shipped to fulfill orders from customers. Retailers, wholesalers, and other product distributors (which may collectively be referred to as distributors) typically maintain an inventory of various items that may be ordered by clients or customers. This inventory may be maintained and processed at a materials handling facility which may include, but is not limited to, one or more of: warehouses, distribution centers, cross-docking facilities, order fulfillment facilities, packaging facilities, shipping facilities, or other facilities or combinations of facilities for performing one or more functions of material (inventory) handling.

When customer orders are of variable size (e.g., when both item sizes and the quantity of items may vary substantially from order to order), items may typically be placed into shipping containers (e.g., corrugated boxes) having a wide variety of sizes, after they have been sorted into their respective orders. In some materials handling facilities, shipping containers packed with items for customer orders are routed to one of several shipping lines within the facility for final shipment preparation (e.g., protective dunnage may be added, a packing slip may be inserted, the box may be taped shut, and a shipping label may be applied). Therefore, a mix of box type and sizes may be sent to each shipping line. Throughput and/or efficiency of operations in the facility may be negatively impacted when these shipping lines must be able to handle multiple types and sizes of boxes.

Figure 1:
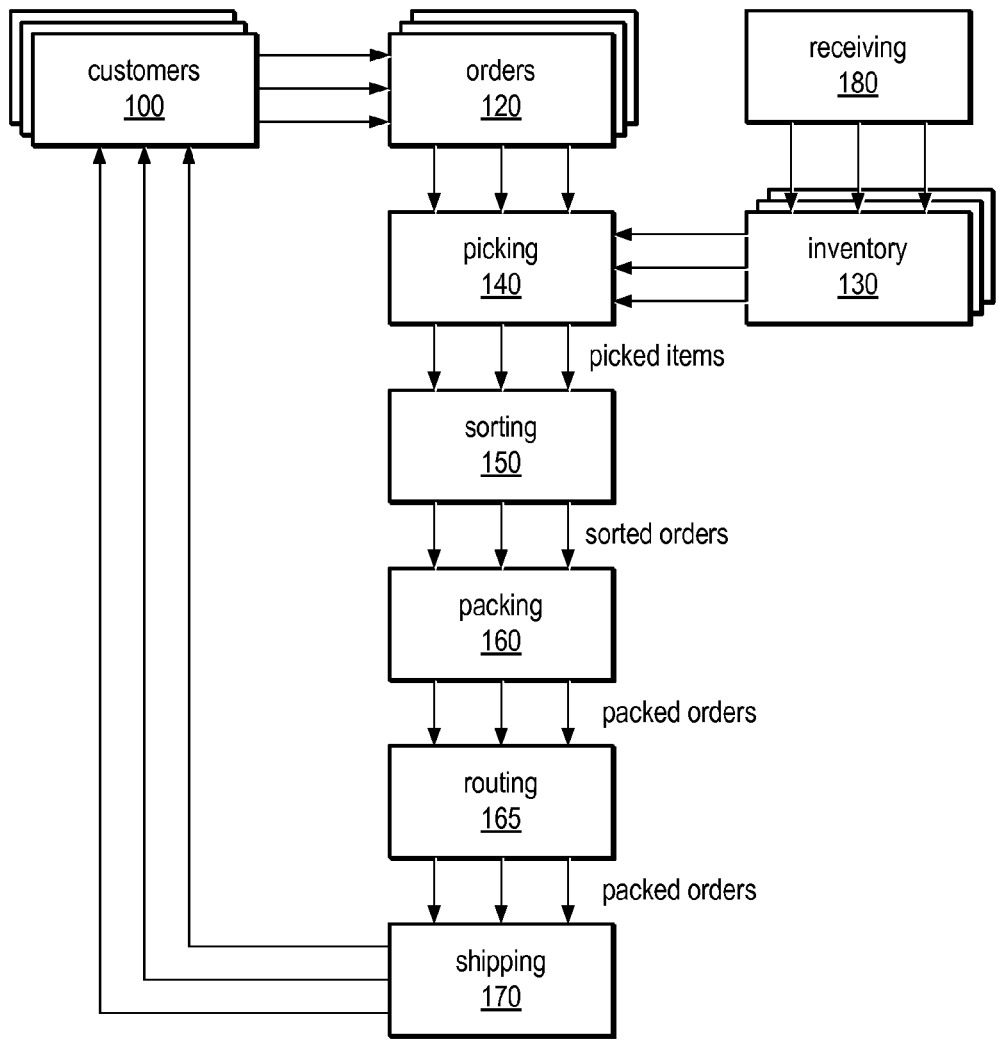
FIG. 1 illustrates a broad view of the operation of a materials handling facility, in one embodiment.

While embodiments described herein by way of example for several embodiments and illustrative drawings, those skilled in the art will recognize that the embodiments not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

An overall facility management system (e.g. a warehouse management system or inventory management system) may include various components usable to facilitate efficient and/or cost-effective operations in a materials handling facility. For example, in some embodiments, such a system may include a predictive router, configured to divert item packages to different shipment preparation areas, or shipping lines, in a materials handling facility based on their predicted shipping container sizes. A predictive router may in some embodiments be configured to work together with a container recommender and/or a routing performance analyzer to facilitate packing and shipping operations or may be configured to work independent of a package performance analyzer, in different embodiments. In some embodiments, packed shipping containers may be routed to a particular shipping line by the predictive router based on whether they require special handling, such as gift-wrapping, co-branding (which may require different labeling and/or marking, for example), specialized transportation services (media mailing services), or premium shipping (e.g., which may require additional packaging, different labeling/marking, or a higher priority in shipment preparation, in some cases) instead of, or in addition to their predicted container sizes.

A materials handling facility may ship groups of items in a variety of different shipping container types and sizes, in different embodiments. The cost of shipping a group of items may be highly dependent on the particular shipping container chosen for shipping the group of items. For example, shipping a group of items in the smallest available box that is suitable for shipping the items may cost less than shipping the same items in a larger box, due to the lower cost of the smaller box, and/or a reduction in transportation costs based on the size of the box and/or an increase in the number of boxes that can be shipped together in the same space (e.g., in a single truck or ocean-going container). In addition, in some facilities, smaller boxes may be handled more rapidly and/or efficiently within the shipping operation of the materials facility than larger boxes, as described in more detail below. For these and other reasons, it may be advantageous to use the smallest suitable box for any given shipment.

In some embodiments, one or more of the shipping lines in the materials handling facility may be customized to handle them. For example, one or more shipping lanes may be configured to handle only the smallest size box in the facility. These shipping lines may be able to operate at a faster throughput rate if they are only required to handle the smallest box size, rather than a mix of box sizes. In another example, each shipping line may be configured to handle a particular box size or a narrow range of box sizes, which may improve throughput. Note that in various embodiments, any time a shipping container (e.g., a packed box) of a given size can be efficiently handled (e.g., prepared for shipment) in a given shipping line, the facility may save money in time and/or re-work over the use of a more generic shipping line, even if the box used was not the smallest available box. For example, if a particular shipping line is configured to manage only the largest or tallest available box size, item packages packed in boxes of this size may be most efficiently prepared for shipment using this customized line.

In some embodiments, in order to take full advantage of cost savings opportunities associated with the use of smaller boxes and/or the use of shipping lines customized for particular box sizes, a predictive router may be used to route each item package to a particular shipping line based on the box size that is predicted to be used to ship the item package. In some embodiments, the predictive router may make such a routing decision by predicting that a packing agent will use a recommended container (e.g., one recommended by an automated container recommender, as described later) for a given item package and that the recommended container is appropriate for that item package. In some embodiments, the use of such a predictive router, along with a container recommender, may allow the facility to take advantage of customized shipment preparation areas more often and/or more cost-effectively than a facility that explicitly determines, attempts to determine, or does not determine the actual container size used to handle each of its item packages.

A predictive router, as described herein, may be implemented in one or more software modules executing on one or more nodes of a computing system (e.g., as program instructions and data structures configured to implement functionality described), or in any combination of hardware and software components suitable for implementing the functionality described. For example, the predictive router may in some embodiments be implemented as program instructions encoded on a computer-readable storage medium for execution by a computing system. A predictive router is described in more detail below, according to various embodiments.

For illustrative purposes, some embodiments of a predictive router are described below in which particular item, item package, and/or container parameters are processed or analyzed in particular manners, and in which particular types of analyses and processing of parameters is performed. However, those skilled in the art will appreciate that the techniques described may be used in a wide variety of other situations, and that embodiments of these techniques are not limited to the details of these examples.

An exemplary block diagram of a materials handling facility, which in one embodiment may be an order fulfillment facility configured to utilize a predictive router, is illustrated in FIG. 1. In this example, multiple customers 100 may submit orders 120 to a distributor, where each order 120 specifies one or more items from inventory 130 to be shipped to the customer or to another entity specified in the order. An order fulfillment facility typically includes a receiving operation 180 for receiving shipments of stock from various vendors and storing the received stock in inventory 130. To fulfill the customer orders 120, the one or more items specified in each order may be retrieved or "picked" from inventory 130 (which may also be referred to as stock storage) in the order fulfillment facility, as indicated by block 140. In various embodiments, the items in an order may be divided into multiple item groups (i.e., shipment sets) for shipping by a shipment splitting analyzer before pick lists are generated (not shown). Picked items may be delivered to one or more stations in the order fulfillment facility for sorting 150 into their respective orders or shipment sets and for packing 160. A package routing operation 165 may sort packed orders for routing to one of two or more shipping operations 170, from which they may be shipped to the customers 100. Package routing operation 165 may in various embodiments be automated or manual. Package routing operation 165 may receive an indication of the destination (e.g., the shipping operation 170) to which each packed order should be routed from a central control system. In some embodiments, a predictive router may determine a routing destination for each packed order dependent on the size of a container that is recommended for shipping the order. The predictive router may provide an indication of the predictive routing destination to the central control system, and/or directly to the package routing operation 165, so that the packed order may be diverted to an appropriate shipping operation 170, as described herein. Note that not every fulfillment facility may include both sorting and packing stations. In certain embodiments, agents may transfer picked items directly to a packing station, such as packing station 160, while in other embodiments agents may transfer picked items to a combination sorting and packing station (not illustrated). This may result in a stream and/or batches of picked items for multiple incomplete or complete orders being delivered to sorting 150 for sorting into their respective orders or shipment sets for packing 160, routing 165, and shipping 170, according to one embodiment.

Note that portions of an order may be received at different times, so sorting 150 and packing 160 may have to wait for one or more items for some orders or shipment sets to be delivered to the sorting station(s) before completion of processing of the orders. As noted above, a picked, packed, routed and shipped order may not necessarily include all of the items ordered by the customer; a shipped order may include only a subset of the ordered items available to ship at one time from one inventory-storing location. Also note that the various operations of an order fulfillment facility may be located in one building or facility, or alternatively may be spread or subdivided across two or more buildings or facilities. In various embodiments, items and groups of items may be transported between the stations or operations of the facility in one or more containers, through one or more portals, and/or using one or more dimensionally-constrained paths (e.g., chutes, pneumatic tubes, or conveyor belts), as described herein.

In some embodiments, information about the containers used in handling one or more items during the operations described above may be automatically captured as a by-product of normal operation. For example, the facility management system may receive or capture an identifier of a shipping container (e.g., a box) when an agent places an item in the container, according to various embodiments. Similarly, the facility management system may automatically receive or capture an identifier of an item when it is placed in the container, in some embodiments. For example, a bar code or Radio Frequency Identification tag (RFID tag) of a container and/or an item may be scanned automatically as part of normal operations when items are placed in a container for shipping, and the data from the scanner may be automatically stored in one or more tables, databases, or other data structures accessible by the facility management system. Therefore, in some embodiments, no additional steps may need to be performed to capture identifiers of the items and the containers in which they are placed. In some embodiments, these identifiers may be associated with one or more entries in tables, databases, or other data structures containing dimension and/or weight values currently associated with various containers and items.

A facility management system may in some embodiments include a container recommender configured to instruct or recommend the selection, from among available containers, of a container in which to place one or more items, or a portal or path through which to convey the items, during the receiving 180, storing in inventory 130, picking 140, sorting 150, packing 160, routing 165, or shipping 170 operations described above. For example, the system may be configured to recommend various boxes or other containers suitable for shipping one or more items or for storing or conveying one or more items in the materials handling facility, dependent on item dimension values and/or weight values currently associated with the items. In one embodiment, the system may recommend a particular box type and/or size suitable for shipping a group of items associated with a customer order based on item dimension values and/or weights provided by the vendor of each of the items in the group and the dimensions and weight limitations of the boxes available for shipping. In other embodiments, the system may recommend a particular box type and/or size suitable for shipping a group of items dependent on item dimension values and/or weights measured in the facility or learned by the facility management system through an automated process of successive approximation. In some embodiments, the selection of containers that are neither too small nor larger than they need to be may result in more efficient use of space in the facility for storage and other operations, and may also reduce costs associated with floor space, packing materials, or transportation (e.g., shipping). In some embodiments, the box recommender may be used to estimate corresponding dimensions of a container suitable for storing, transporting, or shipping the items that is space-efficient and/or cost effective. Note that costs associated with the selection of an inappropriate container for a group of items may include labor costs associated with rework, if they must be removed from one container and placed in one or more other containers.

Note that, as used herein, "item packages" may refer to items grouped for shipping to a customer or items grouped for any other operation within a materials handling facility, such as for storing in inventory or transporting to a packing or shipping station. In various embodiments, "containers" may include pallets, crates, cases, bins, boxes, carts, totes, conveyor belts, shelves, cabinets, or any other apparatus capable of storing, conveying or shipping one or more items.

In some embodiments, the facility management system may make particular assumptions about item dimensions or may assign item dimensions according to a standard algorithm, or company policy, in order to facilitate the recommendation of containers for item packages and/or shipment splitting analysis. For example, in one embodiment, the item dimension having the largest value may be designated to be the "height," the dimension having the second largest value may be designated to be the "length," and the dimension having the smallest value may be designated to be the "width" of the item. In such embodiments, the dimensions of containers may also be designated using the same assumptions. In other embodiments, different assumptions or assignments may be made, or the designation of length, height, and width dimensions of items or containers may be arbitrary. In some embodiments, standards or policies may specify other aspects of the packing and/or shipping operations of the facility, such as a default placement or orientation for certain items within containers or a specific packing algorithm to be assumed when recommending containers. For example, a policy may specify that the largest or heaviest item in an item package or shipment set should be placed horizontally along the bottom of shipping boxes.

A facility management system, including a predictive router, as described herein in various embodiments, may be utilized in a number of different facilities and situations, including, but not limited to materials handling facilities, order fulfillment centers, rental centers, distribution centers, packaging facilities, shipping facilities, libraries, museums, warehouse storage facilities, and the like. Note that the arrangement and order of operations illustrated by FIG. 1 is merely one example of many possible embodiments of the operation of an order fulfillment facility utilizing a facility management system or stand-alone predictive router. Other types of materials handling, manufacturing, or order fulfillment facilities suitable for application of a predictive router may include different, fewer, or additional operations and resources, according to different embodiments.

In some embodiments, a materials handling facility may store different instances of items in different individual inventory areas within inventory 130. Additionally, different items may be stored together in a single inventory area, according to particular embodiments. In some cases, storing different items together may result in more efficient use of total inventory space than using a single inventory area for multiple copies of a single item or product. In other cases it may be beneficial to store similar items together to make better use of inventory space. In some embodiments, such as that illustrated in FIG. 2, an inventory area within inventory 130 may include both similar items stored together, such as on one shelf, and different items stored together, such as on another shelf. In this example, storing different compact discs (CDs) together on a single inventory shelf, as shown in inventory area 235b, may use the available inventory space more efficiently than storing one CD among other items of greatly differing size and shape, such electronic devices, clothing, or other items. In some embodiments, a materials handling facility may also store items of similar, but not identical, shape and size together in a single inventory area. For instance, in one embodiment, items such as books, CDs, and digital video discs (DVDs) may all be stored together, as shown in inventory area 235a. In still other embodiments, different items, with different shapes and sizes, may all be stored together. For example, inventory area 235e illustrates clothing and electronic items stored along with books, CDs, etc.

Figure 2:
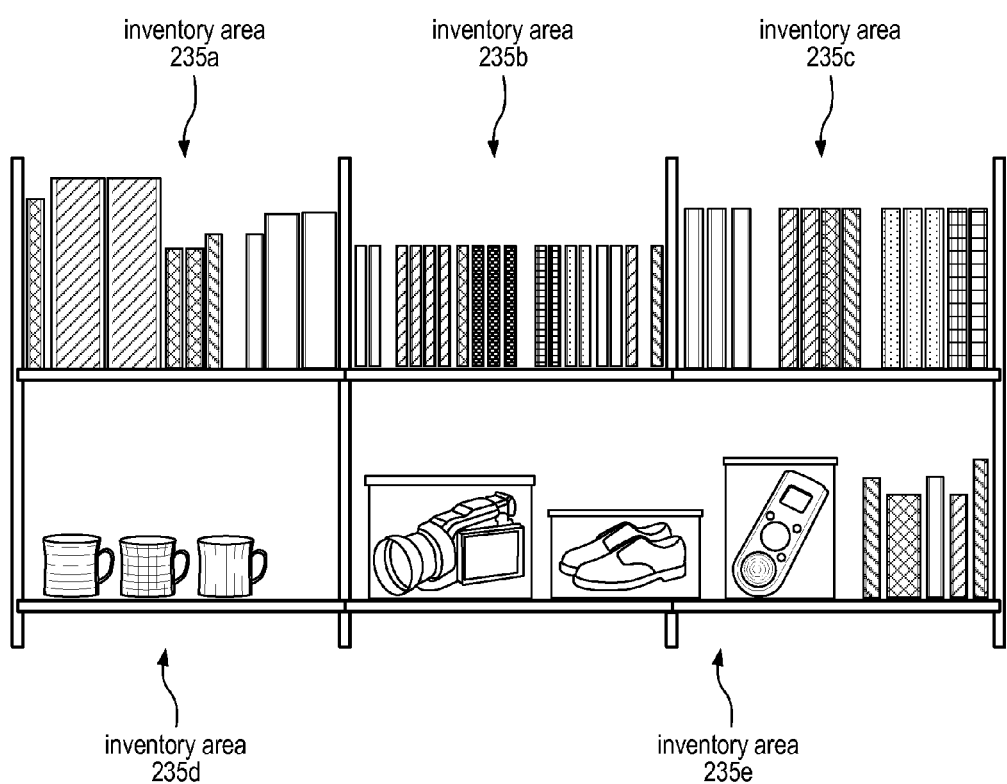
FIG. 2 illustrates various items stored in a multi-shelf inventory area, according to one embodiment.

The items in a materials handling facility may be of varying shapes and sizes, as shown in the exemplary inventory areas illustrated in FIG. 2. In this example, some items in the materials handling facility are irregularly shaped. In some embodiments, irregularly shaped items may be stored in boxes or other regularly shaped packaging, which may facilitate container recommendation, shipment splitting analysis, and/or more efficient storage, such as by making stacking of such items possible. This is illustrated in inventory area 235e. In other embodiments, irregularly shaped items may be stored, packed, and/or shipped without placing them in regularly shaped packaging. This is illustrated in inventory area 235d. According to various embodiments, container recommendation, as described herein, may be utilized with any regularly shaped or irregularly shaped items.

In a materials handling facility, such as the order fulfillment facility illustrated in FIG. 1, processing of customer orders may be made more efficient through the use of a predictive router, as described herein. For example, in some materials handling facilities without a predictive router, it may be challenging to accurately divert packages based on their sizes to shipping lanes customized for a particular box size or range of box sizes. As previously noted, if the facility ships orders in a wide variety of box types and sizes, a mix of different box types and size may be sent by conveyors to various shipping operations where final shipment preparation may be completed. For example, a shipping operation, such as that illustrated as shipping operation 170 in FIG. 1, may include a box-filling station at which dunnage and/or printed material may be added to the packed box, a taping station at which the box may be taped shut, a weighing station (e.g., for determining the weight of the packed and filled box, which may be used to determine the most cost-effective transportation method or to detect item package incongruities), and a printing/labeling station at which a shipping label may be printed and applied to the box. In various embodiments, the stations of a shipping operation may be arranged as a shipping line configured for performing these operations in order, either automatically or manually.

Each shipping line may include a conveyor, which may be timed to provide packed boxes to each of the shipment preparation stations according to the throughput that the line can accommodate. In some embodiments, a conveyor on a shipping line that is customized for smaller and/or lighter boxes may be able to operate at a higher speed than one that must handle larger and/or heavier boxes, or one that must handle a wide variety of box sizes. Similarly, a printer station (at which a shipping label is printed and then applied to each box) may be a potential source of latency in a shipment preparation operation. For example, a printer/applicator may be configured to print a shipping label and then stroke down and back up again to apply the label to the box. If the printer must be able to perform this operation on boxes of multiple sizes (especially if the size of the boxes varies widely), the printer may need to be positioned high enough that it is initially above the largest (i.e., tallest) box size to be handled by the shipping line, and may need to be able to stroke far enough down to apply a label to the smallest (i.e., the shortest) box to be handled by the shipping line. Therefore, the printer/applicator may not be able to be operated any faster than a rate corresponding to its longest potential stroke length. Similarly, in a taping station, equipment to tape each box closed (e.g., a taper) may not be very efficient if it must be able to handle a wide range of box sizes/heights. In some embodiments, an individual taper, printer/applicator, or other piece of equipment used in a shipping operation 170 may not be able to handle the range of stroke lengths that would be required to handle all the types and/or sizes of shipping containers used in the facility at all, or may not be able to handle them efficiently. For example, it may be difficult to configure a single shipping line to be able to handle boxes that are 18 inches high and those that are three inches high, while maintaining a high throughput.

In general, due to the size difference between various boxes used within a materials handling facility, the efficiency, cost, and/or overall throughput of various operations in a materials handling facility may be improved by customizing one or more shipping lines for a particular container type/size or a relatively narrow range of container sizes. For example, equipment used to fill, tape, or apply a shipping label to a box may operate most efficiently when the range of heights or widths of the boxes presented to it falls within a narrow range, allowing the equipment to be positioned closer to each box and the stroke length of its movements to be shorter. The customizations may include adjustment of conveyor speeds, re-positioning (e.g., lowering) of printer/applicator units or tapers, and possibly the use of alternative scales for finer resolution in a weighing station for these shipping lines. For example, on a shipping line that is customized for a given box size, or a given box height, the printer/applicator may be positioned so that the stroke cycle starts just above this box height (e.g., so that it hovers one inch above the boxes between applications), so that the stroke length (and stroke time) are very short. In another embodiment, such a printer may be configured to support two or more box sizes (or box heights) in a narrow range, thus shortening the stroke cycle over a configuration that must handle all available box sizes (or a wider range of box sizes). Similarly, in a taping station, equipment to tape each box closed (e.g., a taper) may be used more efficiently if it is customized to one box size/height or a narrow range of box sizes/heights than if it must handle a wider range of box sizes/heights. For example, some pieces of equipment may operate using a fixed (but configurable) starting position and stroke length, while others may be configurable to operate using a fixed starting position and a range of stroke lengths. In addition, a shipping line customized for a given box size may be able to handle a higher throughput, since each operation in the shipment preparation operation may be customized (and may thus be more quickly executed) for that box size. Therefore, in some embodiments, a given size or height (or a range of sizes or heights) may be chosen for each of two or more shipping lines in the facility, and the equipment on that line may be configured for the selected size, height, or range of sizes or heights.

As described herein, it may be desirable to customize at least some of the shipping lines for the smallest available boxes in order to increase overall throughput in the facility. As a result, it may be desirable to accurately route boxes to particular shipping lines based on their size (e.g., instead of, or in addition to, routing them based on other parameters, such as shipment priority, need for gift wrapping, etc.), in order to take advantage of such customization. For example, in one embodiment, one or more lines may be configured to handle the smallest available shipping container. In this example, the smallest available shipping container may be a corrugated box that measures 10×7×3 inches. This box may cost significantly less than the next smallest box (e.g., a box measuring 12×9×4 inches). Therefore, using this box for as many shipments as possible may reduce overall costs in the facility. In some embodiments, a predictive router may be used to determine which shipments can take advantage of such customized lines, and the predictive router may allow that determination to be performed for all or most item packages, without adding extra equipment, labor, or time to existing operations within the facility.

In some embodiments, a computer-implemented method for performing predictive routing may facilitate more efficient operations in a material handling facility. A predictive router may automatically determine how a packed item package should be routed within the facility, so that each item package may be prepared for shipment by an appropriate shipping operation in the facility. In some embodiments, the predictive router may be configured to determine the best (i.e., the most labor-efficient, quickest, and/or cost-effective) destination to which a packed item package should be routed, depending on the type and quantity of items in an item package, available box sizes (along with their capacity and shipping costs), the configuration of each shipping line in the facility, and other variables. Inputs to a predictive router may in some embodiments include information specific to an item package, such as an identifier of a materials handling facility in which the item package is to be packed for shipping (e.g., a warehouse identifier), a list of items in the item package (including, e.g., item identifiers and a quantity of each item), and order information (e.g., an order identifier, a customer identifier, a unique serial number, an indication of any special handling instructions, such as gift wrapping or co-branding instructions, shipping preferences, specialized transportation services, etc.). Additional inputs to the predictive router, or to a container recommender configured to work in conjunction with the predictive router, may not be specific (or exclusively applied) to a given item package. In some embodiments, these inputs may include dimension, volume, and/or weight values associated with the items in the item package, shipping cost information, and a list of available box sizes. In some embodiments, these additional inputs may be obtained from one or more tables, databases, or other data structures accessible by the container recommender and/or predictive router.

The predictive router may in various embodiments be configured to determine a routing destination for each item package according to different fixed or configurable parameters available to it and/or according to policies of the materials handling facility. For example, the predictive router may in some embodiments take into consideration design and/or safety constraints of a target facility and/or of each of the shipping lines therein, such as the capacity of conveyor belts or chutes in the facility or on particular shipping lines (e.g., to avoid backups), the largest size box that can be safely used at the facility or on particular shipping lines, or the maximum allowed weight of a box that can be handled by the sorting equipment in the facility or on particular shipping lines (e.g., 25 pounds). In some embodiments, the predictive router may take into consideration that some item packages may have a relationship that recommends or requires them to be shipped together. For example, in some embodiments, a customer may specify that they would like all boxes making up a single order to "ship together" or to "ship at same time when the order is complete". Other policies within the facility may be related to gift-wrapping services, premium shipping, or other special handling instructions. For example, a given shipping line may be configure to handle shipment preparation for item packages containing fragile items, which may be packed in particular box types (e.g., heavier and/or sturdier boxes), or in large boxes containing extra packing material. In another example, if an item package include items to be gift-wrapped, the predictive router may first route the item package to a gift-wrapping station, and then may re-route the item package dependent on the recommended container associated with the item package. In yet another example, two shipping lines may be configured to handle item packages that include items to be gift wrapped, one of which is customized for relatively small boxes, and the other of which is customized for larger boxes. In this example, the predictive router may determine the predictive routing destination dependent on both the gift-wrapping requirement and the recommended box. Similarly, one or more shipping lines may be configured to accommodate orders from premium customers or those for which premium shipping or specialized transportation services are required (e.g., one or more "express" shipping lines, or "media" shipping lines), or one or more shipping lines configured to accommodate co-branding requirements (e.g., the printing and application of non-standard shipping labels), and the predictive router may determine a predictive destination (e.g., a particular shipping line) to which an item package should be routed dependent on these instructions and on the recommended box for the item package.

The output of the predictive router may include an indication of the predictive routing destination, which may be stored in a database, table, or other data structure accessible by a package routing operation (e.g., routing operation 165), or may be provided to a central control system and/or directly to a package routing operation, in different embodiments. Note that in some embodiments, the predictive router may be invoked more than once for a given item package. For example, the predictive router may determine an initial routing destination prior to the item package being packed (dependent in part on the output of the container recommender), and may determine an updated routing destination at a later time, dependent on feedback from the system, and/or on additional information received by the predictive router subsequent to making the initial determination. Various mechanisms for determining if and how a routing destination should be updated are described in more detail below.

In some embodiments, an application operating on behalf of the materials handling facility, or a parent organization thereof, upstream of the predictive router may include functionality for dividing a customer order into multiple item packages directed to different materials handling facilities according to item availability (as described above), customer and/or order parameters and/or other business policies, before calling the shipment splitting analyzer. In some embodiments, a customer order may be divided into multiple item packages dependent on a service level agreement with a given customer or associated with a given customer order (i.e., a premium service level for a customer or a premium shipping option for an order). For example, a customer order from a preferred customer or associated with a premium shipping option may be split into two or more item packages by an upstream fulfillment planning engine and each item package may be directed to a different order fulfillment facility so that each item in the customer order may be picked, packed and shipped from the facility nearest to the customer or from which shipping may be most quickly performed, or an item package may be split into multiple shipments (from a same or different facilities) in order to facilitate faster picking than if all the items are in one shipment set. In another example, a customer order specifying that a portion of the items be gift wrapped may be split into multiple item packages so that items to be gift wrapped are directed to one or more facilities having gift wrapping capability and other items are directed to one or more facilities that do not have gift wrapping capability. In yet another example, an upstream fulfillment planning engine may be configured to split a customer order into multiple item packages if some of the items in the item package are not available (i.e., if they are on backorder), so that the available items may be shipped without waiting for all of the items to be available. Conversely, in some embodiments, an upstream fulfillment planning engine may be configured to determine that an order should not be split based on a customer preference or customer-specified parameter for a given order (e.g., if a customer chooses a "ship all items together" option, rather than a "ship as fast as possible" option). Note that in some embodiments, customer input may also be used to determine whether to wait for back-ordered items to ship with other items or to ship available items ahead of any back-ordered items. In some embodiments, a shipment splitting analyzer may be configured to divide the items making up an order (or partial order) received at a given facility into multiple shipment sets to be shipped in separate boxes. In such embodiments, a predictive router may be configured to route each of the shipment sets to the same routing destination, or may be configured to route each of the shipment sets of a particular routing destination dependent on a recommended container for the shipment set independent of the predictive routing destinations of other shipment sets of the same, according to various policies of the facility.

The predictive router may load parameter values specifying routing criteria, item attributes (e.g., dimensions, volume, weight, relationships with other items, fragility, etc.) and/or container information (e.g., dimensions, volume, weight capacity, costs of shipping materials, transportation costs, facility-specific constraints, customer-specific constraints, destination-specific constraints, etc.) from one or more data stores within or remote to the materials handling facility. The predictive router, along with the container recommender, may determine a routing destination for the item package based on all or a portion of the input information. In some embodiments the predictive router may return the results to an upstream application (which in some embodiments may be a facility management system application that called the predictive router), while in others it may be configured to pass the results to a downstream application serving the operation to which an individual item package is directed (e.g., a package routing operation and/or a shipping operation).

In some materials handling facilities, a facility management system may attempt to determine a routing destination for a given item package based on the actual size of the shipping container that has been packed with the items corresponding to the item package. For example, in some embodiments, the system may be configured to attempt to determine the actual container being used to ship the item package by scanning an indicator of the actual container and/or its size (e.g., a box dimension bar code) that is pre-printed on each container by the manufacturer before it is assembled, and, if successful, may route the container to an appropriate routing destination (e.g., an appropriate shipping line) for shipment preparation. However, a read rate for scanning such bar codes (e.g., scanning bar codes pre-printed on a corrugated box) may not be very high, in some embodiments. For example, the read rate for bar codes pre-printed on shipping containers may vary widely based on the printing process used (e.g., screen printing, or another low-quality process), the material and/or color of the material on which the bar code is printed (e.g., depending on its uniformity, texture, and/or the contrast between the material and the printing), and/or other factors. A typical bar code may consist of a black print on brown corrugate, and this low-contrast printing may make the code difficult to read. In addition, as printing plates age, print quality may degrade even further. If there are quality issues with a particular batch of pre-printed bar codes for one or more box sizes, the read rate in the materials facility may be considerably lower than the typical or ideal read rate for those bar codes. For example, there may be one read rate that is typical under ideal conditions, but this may be quite different than a read rate experienced in a given facility, or for a particular type, size, or manufacturing lot of actual containers. As a result, in facilities in which a router relies on the scanning of box dimension bar codes to determine the size of the containers used for item packages, many boxes may not be routed correctly, due to misreads of the box dimension bar codes. This may cause rework (and corresponding labor costs) to re-route misdirected boxes in the facility.

In some embodiments, when attempting to read small bar codes (e.g., bar codes pre-printed on the smallest boxes available in the facility), a scanner may read less of the actual bar code signal and more noise, resulting in fewer correct readings. Conversely, the pre-printed bar codes on larger boxes may be bigger and/or clearer, and thus may be easier to scan correctly. Read rates may also be affected by the position of the scanner, in some embodiments. For example, it may be difficult to position a scanner in such a way that it can accurately scan bar codes on boxes having a wide variety of sizes as they pass the scanner, since the bar codes may be pre-printed at different heights on boxes of different sizes. In addition, if the boxes are conveyed on a high-speed conveyor (e.g., on the order of hundreds of feet per second), and/or if the boxes are able to turn (or turn over) while being passed by the scanner, the scanner may not be able to accurately read the bar codes for all of the boxes. Again, these issues may in some embodiments be more common for the smallest boxes in the facility.

In one example, a theoretical read rate for pre-printed box dimension bar codes may be on the order of 85%-90%, but if the read rate for bar codes on the smallest boxes in the facility is only 60%, the overall read rate experienced in the facility might drop to only 70%-75%. In this example, because the bar codes on the smaller/smallest boxes may be the most difficult to read, these boxes may be directed to a generic shipping line (e.g., one that is not customized for a particular box size or box size range) or to an exception handling area for re-routing more often than larger boxes. Thus, any advantages that could be gained by handling these smaller/smallest boxes on a shipping line that is customized for efficient processing of these smaller/smallest boxes may not be realized. For example, in one embodiment, one or more lines may be configured to handle a given box size (e.g., the smallest box size). However, if one of the smallest boxes turned over as it was traveling on the conveyor, or its box dimension bar code was for other reasons unreadable by the scanner, it may be sent to one of the other shipping lines (e.g., a generic or exception line). In the best case, the box may be handled correctly by the other line, but at a slower effective throughput than if it had been handled in one of the shipping lanes customized for that size. In some cases, however, the shipping line to which an incorrectly routed box is shipped may not be able to handle a misrouted box, and may require human intervention or other exception handling to re-route the box to an appropriate shipping line.

In a facility that does not employ predictive routing, if a scanner fails to "see" (or read) the box dimension bar code, no assumptions may be made about the box size, and no attempt may be made to measure or otherwise determine the box size. In such facilities, a box whose box dimension bar code was not readable may be sent to a generic shipping line or exception-handling shipping line. Although such a box could instead be measured (or scanned) by hand or by expensive dimensional scanning equipment (e.g., including one or more cameras and software to interpret captured images), the cost savings realized by determining the actual box size and using this information to route boxes to the most appropriate shipping lines may not be worth the extra costs associated with extra equipment, time, and/or labor to consistently and accurately determine the box sizes for all item packages. In addition, boxes being routed to a shipping line may in some embodiments be open, or have flaps sticking out, etc., making accurate measurements even more difficult, if not impossible.

As described herein, a predictive router may, in some embodiments, facilitate efficient operations within a materials handling facility by directing item packages to an appropriate routing destination dependent, at least in part, on the size of a shipping container predicted to be used to handle the item package, without requiring dedicated equipment, time, or labor costs for determining the size of the actual shipping container used. For example, in some embodiments, a predictive router may be implemented as program instructions executable by a computing system to perform the operations thereof, as described herein. In other embodiments, a predictive router may be implemented in hardware, or using a combination of hardware and software modules.

As noted above, in some embodiments, a facility management system may include a container recommender. In some embodiments, the container recommender may recommended a smallest container in which the item package (including the one or more items and/or any non-item contents) may be transported within a materials handling facility or in which the item package may be shipped. The recommendation may be generated by, or received by, a module of an overall facility management system or of the predictive router, as described herein, and may be implemented in any combination of hardware and software within the materials handling facility, in various embodiments. In other embodiments, the recommendation may be received from a remote system that is configured to exchange information with the operations of the materials handling facility. For example, a container recommender may be implemented as a software application executing on a computing system in the materials handling facility and configured to implement recommending a container for an item package. It may be configured to receive inputs from other software applications, agents working in the facility or remotely, and/or automated systems within the facility (e.g., scanners, sensors, automated storing, picking, or packing equipment, or software applications managing one or more local or remote data stores.) In another example, the recommendation may be received from a separate mechanism, such as a container recommender implemented in a combination of hardware and software executing on the same or a different computing system within the materials handling facility or remotely.

A container recommender may be configured to recommend a container, portal, or path for handling the item package based on the currently stored volume and/or dimensions of each of the items included in the item package. For example, in one embodiment, the container recommender may base its decision on item dimensions gathered through an automated dimensioning process (e.g., one employing a CubiScan® system), and may have a fairly high level of accuracy. In other embodiments, the stored item dimensions may be estimated based on information received from a manufacturer or supplier of the items, or based on a process of successive approximation as the items are handled within the facility. In some embodiments, the container recommender may calculate the overall dimensions of the item package based on the item dimensions of each of the items as well as dimensions of any required non-item contents (if any). In such cases, the container recommender may be configured to recommend a smallest available container in which the grouped items will fit, a portal through which they may pass, or a dimensionally-constrained path on which they may be conveyed based on the calculated overall dimensions. In other embodiments, the container recommender may to use a standard or custom bin-packing algorithm to determine, for each available container, whether or not the items will fit in the container. In some embodiments, the container recommender may begin its recommendation process by determining if the items will fit in the smallest available container, or through the smallest portal or path, and if not, repeating its determination for each other container, portal, or path in turn, from smallest to largest, until determining that the items will fit into one of the containers or through one of the portals or paths. In other embodiments, the identification of suitable containers, portals, or paths for handling the package may be performed in other manners. For example, the container recommender may track container, portal, or path types corresponding to those handling various groups of item contents, and may retrieve an indication of one or more appropriate container, portal, or path types for handling the current item contents based on a stored mapping for those contents.

Recommending a container, portal, or path may include displaying an indicator of the container, portal, or path to be used on an input/output device readable by an agent working in the materials handling facility, in some embodiments. In other embodiments, a recommendation for a container, portal, or path may be printed for an agent, such as on a pick list or packing list. In still other embodiments, a machine may be configured to pick and/or present a container (such as a box) to an agent or to an automated packing system based on the recommendation or to automatically transport the items to a portal, path, or packing station (e.g., one handling item packages having a particular range of items dimensions) for further handling. The agents and operations in the facility may be encouraged to use these recommendations, as choosing too large a box may result in both increased material (e.g., corrugate) and shipping costs, while choosing too small a box may result in damage and/or rework, which may also add costs. In some embodiments, packers may be measured for compliance with the recommendations made by the container recommender and/or exceptions may be analyzed to determine if the container recommendation was not suitable (e.g., due to the use of incorrect or outdated weight or dimension information for various items).

In some embodiments, container recommendations may be followed a high percentage of the time (e.g., on the order of 90-95% of the time). Therefore, in some embodiments, the system may use these recommendations when determining a routing destination for an item package with similar results (e.g., 90-95% accuracy). For example, rather than attempting to read a box dimension bar code on each box (which may add costs in terms of equipment and time, and may have an accuracy that is no better than the read rate of scanner), the system may instead predict that each item package is being handled in a box of the type and size that was recommended by the container recommender, which is known. In other words, in some embodiments, a predictive router may route a given item package to a particular shipping line in a materials handling facility dependent, at least in part, on the output of a container recommender (i.e., based on the recommended container for that item package). For example, if the container recommender recommends the smallest box size available in the facility for a given item package (e.g., a box size for which one or more shipping lines may be customized to take advantage of its size/height), the predictive router may set the routing destination for the item package to one of the shipping lines so customized, unless any special handling requirements dictate that another shipping line be used. In various embodiments, the predictive router may set the routing destination at the time of packing (whether or not the item package is actually placed in the recommended container), or at any other time prior to the item package reaching a package routing operation that sorts packed item packages by their routing destination and directs them to a given shipping line.

Figure 3:
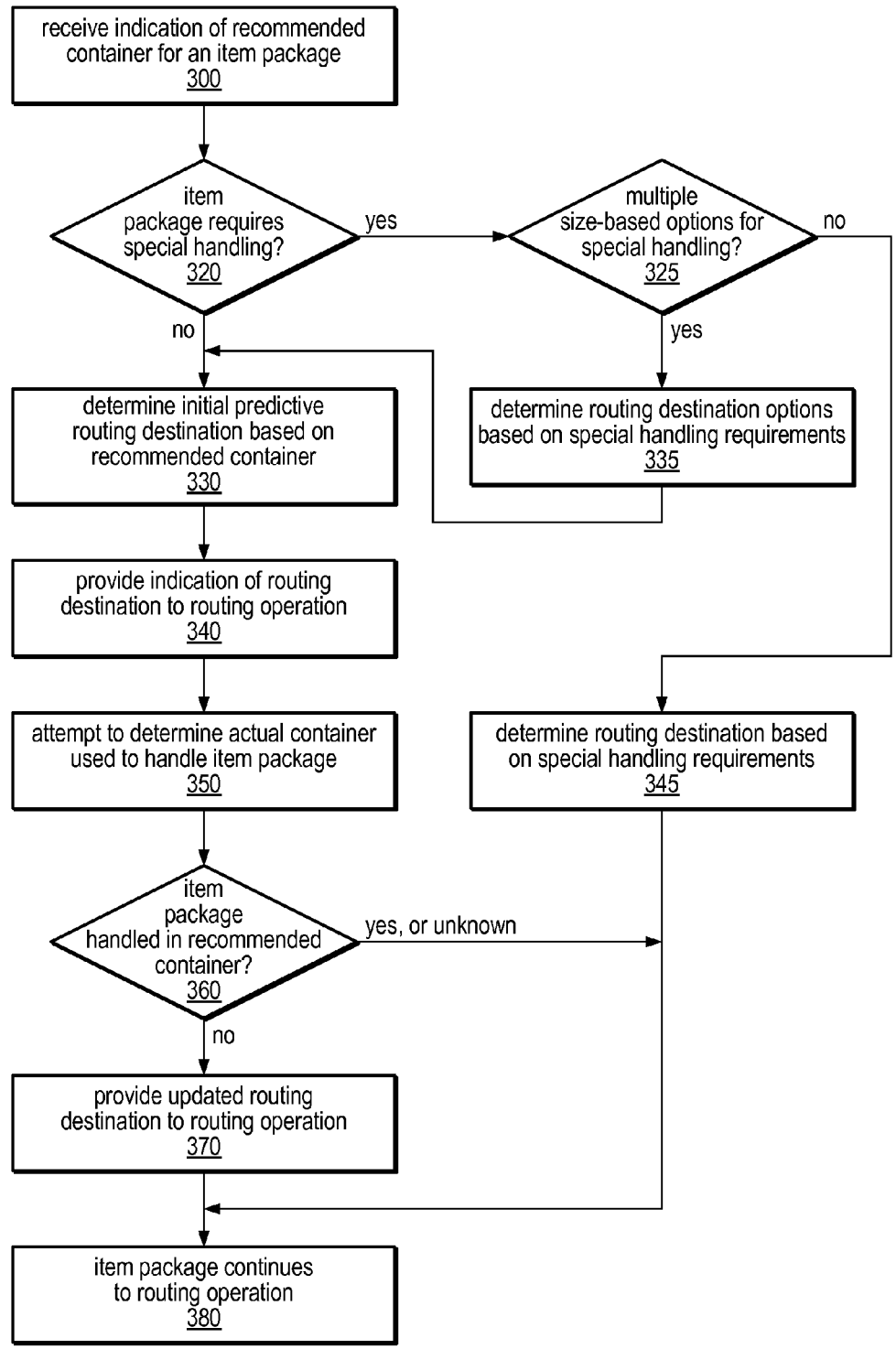
FIGS. 3 and 4 illustrate a method for predictive routing of item packages in a materials handling facility, according to one embodiment.
Figure 4:
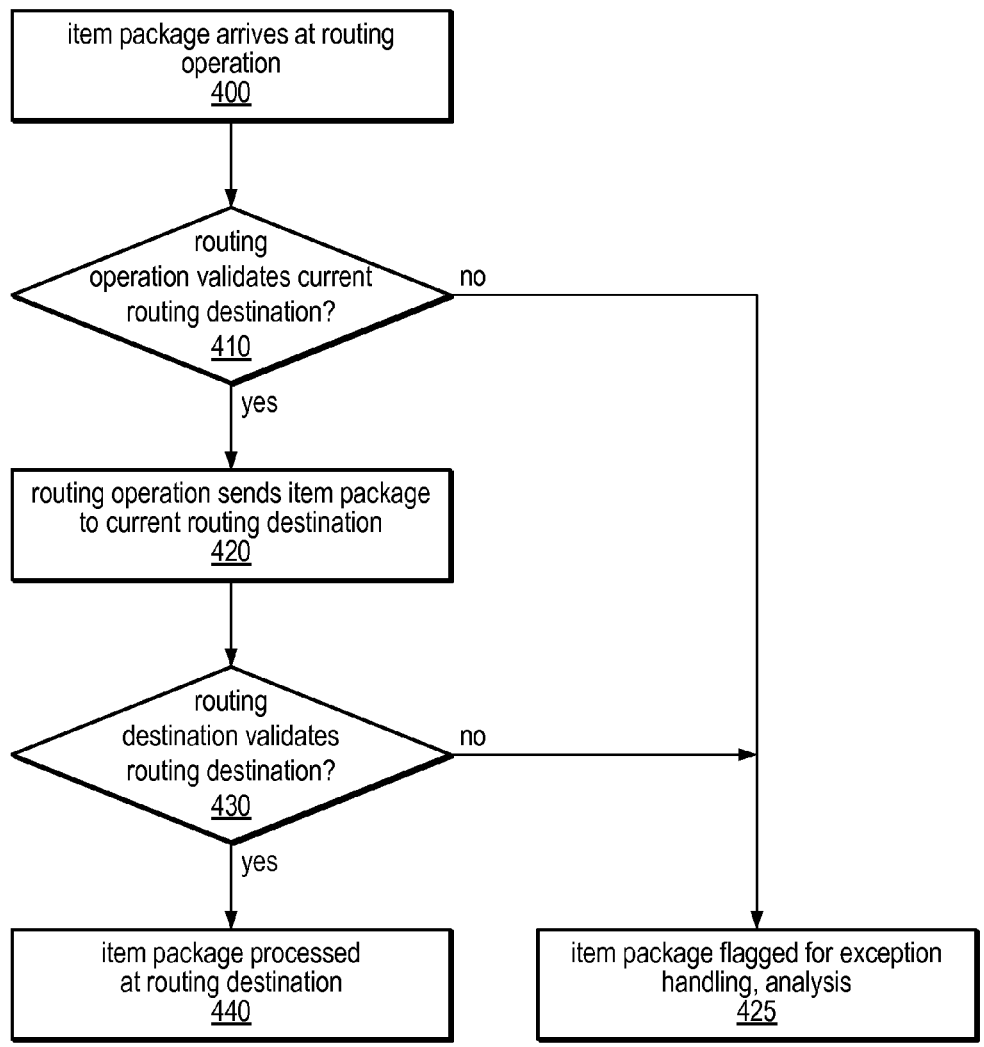

FIGS. 3 and 4 illustrate a computer-implemented method for predictive routing, according to one embodiment. In this example, the predictive router may receive an indication of a recommended container for a particular item package, as in 300. For example, the predictive router may receive this information from a container recommender, as described above. In various embodiments, when an item package reaches a packing station, a container recommender may be consulted to obtain a recommendation of a box in which to ship the item package. Note that the container recommender may determine the container recommendation at the time it is called by a packing operation (e.g., a packing agent) or it may automatically or explicitly perform this determination at any time prior to the item package reaching the packing operation. For example, in some embodiments, the container recommender may be invoked by the system when information about an item package (e.g., a customer order or split shipment request) is received at the facility or at an ordering operation thereof. The container recommendation may be stored in a data store at the facility or remote to the facility, and may be accessible to the packing operation and/or to the package routing operation, as described in more detail herein. A packing operation may receive a recommendation for a container by being presented with a printed or displayed recommendation, being presented with a recommended container, or receiving an indication that an item package has been routed to a particular portal, path, or packing station, in different embodiments. For example, a packing list for an item package (whether electronic or paper) may include a recommendation of a box in which to ship the item package. A packing agent or automated packing mechanism may scan each of the items as they are packed in a box for shipping, in some embodiments.

This information (e.g., an identifier of each of the items) and an identifier of the box (e.g., a unique serial number associated with the box) may be provided to the facility management system automatically as the items and box identifier are scanned, or may be explicitly provided at a later time (e.g., they may be uploaded when the packaging is complete and/or may include other feedback from the agent or automated operation.) In addition, the container recommendation and any information collected as part of the packing operation may be associated with an identifier of the item package and may be stored in one or more tables, databases, or other data structures for further use by operations of the facility or for further analysis.

In various embodiments, the predictive router may receive the container recommendation from the facility management system when it is invoked by the facility management system (e.g., as soon as the recommendation is made, or once the packing operation is complete, or at any other time prior to the item package reaching the sorting operation), or the predictive router may obtain the container recommendation from one or more tables, databases or other data structures in which the recommendation is stored when the predictive router is invoked. As previously noted, other inputs to the predictive router may include an identifier of the item package, a list of the items in the item, package, and a unique serial number associated with the actual shipping container of the item package. For example, in some embodiments, the unique serial number may be printed on a sticker applied to the outside of the actual container (e.g., the box in which the item package is packed) in order to identify the shipment.

Note that a container recommendation may not always be followed at the packing operation, as the recommended container may not be available or the recommendation may not be valid (e.g., if it is based on inaccurate dimensions and/or weights of one or more items or container types). However, the recommendation may in some embodiments be followed often enough that a predictive routing destination determined based on this recommendation may be an appropriate destination (e.g., a suitable, efficient, and/or cost effective for handling a given item package) more often than a destination determined using a method that depends on an ability to accurately and consistently scan box dimension bar codes to determine the actual containers used to ship item packages.

As illustrated in FIG. 3, the predictive router may determine if the item package requires special handling that may affect its routing destination, as in 320. For example, the item package may be associated with parameters that indicate whether the item package should be shipped using a standard or premium shipment method, whether it should be gift-wrapped, and/or whether it is part of a co-branding or partnering shipment, in some embodiments. In some embodiments, predictive routing, as described herein, may be employed with shipments requiring special handling (e.g., if two or more differently configured shipping lines are selectable for each specialty mode). In such embodiments, both special handling requirements and the size/height of a recommended shipping container may be used as part of a matrix of information used to determine a routing destination for the item package. If the item package requires special handling, shown as the positive exit from 320, the method may include determining if there are multiple size-based options associated with the special handling requirements, as in 325. For example, in some embodiments, one or more shipping lines may be configured to accommodate gift wrapping or co-branding options for item packages in large boxes, and one or more other shipping lines may be configured to handle gift wrapping or co-branding options for item packages in small boxes. In this example, a small box that requires gift-wrapping may be routed to a different shipping line than a large box requiring gift-wrapping or a small box that does not require gift-wrapping. In other embodiments, routing may be predicted only for item packages that do not require special handling.

If there are not multiple size-based options associated with special handling options, shown as the negative exit from 325, the method may include determining the routing destination for the item package based on the special handling requirements, without regard to the size of the shipping container in which the item package is packed or the recommended shipping container, as in 345. If, on the other hand, multiple size-based options are available, shown as the positive exit from 325, the method may include determining as least some of the routing destination options based on the special handling requirements, as in 335. Once those options have been identified, the predictive router may determine a predictive routing destination dependent on both the special handling requirements and the recommended container for the item package. This is shown as the path from 335 to 330, in FIG. 3.

If there are no special handling requirements, or if the special handling requirements are associated with multiple size-based options, the method may include determining a predictive routing destination dependent on the recommended container for the item package, as described in more detail herein. This is shown as 330. By making the assumption that the container recommendation is valid and that it is followed, the predictive router may use the container recommendation to determine the initial routing destination of the package at the time the packer places items for the item package in an actual shipping container. For example, if the recommended container is a box measuring 10×7×3 inches, an indicator of the routing destination of the item package may be set to a code that represents a shipping line specifically configured to handle 10×7×3 inch boxes, rather than one configured for larger boxes, or for a wide range of box sizes, regardless of whether the items corresponding to the item package were placed in a box that measures 10×7×3 inches or in a box of another size. In some embodiments, if special handling is required, the indicator of the routing destination may be set to a code representing a shipping line configured to process 10×7×3 inch boxes and configured to process their shipment according to gift-wrapping, co-branding, and/or premium shipping options, for example.

The predictive router may provide an indication of the predictive routing destination to a package routing operation, as shown in 340, and as described herein. As described herein, the predictive router may provide an indication of the predictive routing destination to a central control system instead of, or in addition to, providing it to the package routing operation. In some embodiments, the predictive router and/or central control system may also store the predictive routing destination in a data store and may associate it with an identifier of the item package and/or with the unique serial number of the shipping container. For example, the routing destination code may be associated with the unique serial number of the box and stored in one or more tables, databases, or other data structures within the facility and/or at a remote location.

As noted above, in some embodiments an attempt may be made to determine the actual container in which the item package is packed, as in 350, although the determination itself may not be necessary for the operation of the predictive router. For example, a scanner may be placed at a point in the process flow after the packing operation but before the package routing operation, and may provide an opportunity to correct the predictive routing destination of at least some item shipments that are placed in non-recommended containers. In other embodiments, the method may not include an attempt to determine the actual container of the item package. If it is determined that the item package is not being handled in the recommended container, shown as the negative exit from 360, the method may include providing an updated routing destination to the package routing operation, as in 370. For example, if the actual container may not be handled at the routing destination that was determined based on the recommended container, or if another routing destination may be more appropriate (e.g., more efficient or cost-effective) for handling the actual container, the predictive router may update the routing destination associated with the item package and may provide this updated routing destination to the central control system and/or to the package routing operation. In some embodiments, the routing destination may also be updated in the one or more tables, databases, or other data structures in which the initial routing destination was stored.

In one example, a scanner placed downstream from the packing operation, but upstream from the package routing operation, may attempt to read the box dimension bar code of a packed shipping container, and may also attempt to read its unique serial number label. In this example, if the scanner is able to read the box dimension bar code, an indication of the box type/size may be communicated to the predictive router (e.g., as feedback), and the predictive router may compare previously stored data to determine if the recommended container was used to handle the item package. If the predictive router determines that the recommended container was not used, the predictive router (or another component of the system) may determine whether a different shipping line would be more appropriate (e.g., more efficient or otherwise better able to handle the item package) and may override the initially predicted routing destination. In this example, if the smallest box available in the facility (e.g., a 10×7×3 inch box) was recommended, but a box of a different size was used, the routing destination code may be updated so that the item package is not directed to a shipping line customized for boxes of that size. In this example, if the packer used a 12×9×4 inch box instead, then the routing information initially associated with the item package would have been incorrect, and the package routing operation would have routed the box to one of the shipping lines customized for 10×7×3 in boxes. If, however, the box dimension bar code of the 12×9×4 inch box was read at the scanner before it reached the package routing operation, the routing destination could be updated, resulting in correct routing. In another example, if the second smallest box size was recommended, but the smallest size box was used (and if this was detected by the optional scanner), the initially predicted routing destination may be overridden so that the item package is directed to the custom shipping line. In this way, the item package may be able to take advantage of the customization of the shipping line and may be more efficiently (and/or more quickly) processed by that line, as described herein.

In some embodiments, in addition to reading the box dimension bar code and/or unique serial number label, the optional scanner may be configured to measure the box height (e.g., to determine if the box is open or closed), and may communicate this information to the predictive router and/or a central control system as feedback. For example, in some embodiments, packed boxes may be either open or closed when being conveyed to a routing destination, and may be routed to different destinations dependent, in part, on whether they are open or closed.

As illustrated in FIG. 3, if the item package was handled in the recommended container, or if the scanner cannot read the box dimension bar code of the actual container, the initially predicted routing destination may be maintained. This is shown as the positive exit from 360 and the path to 380. In this example, once the predictive router has determined an initial predictive routing destination dependent on the recommended container and/or any special handling requirements, and, in some cases, the initial predictive routing destination has been corrected according to feedback from an optional scanning operation, the item package may be directed to the package routing operation, as in 380. In this example, the method may continue as illustrated in FIG. 4.

As shown in FIG. 4, the item package may arrive at the package routing operation, as in 400. In some embodiments, the package routing operation itself may include a mechanism for determination of the validity of the current routing destination, as in 410. For example, in some cases, a box that is larger than recommended may be used to handle a given item package, but the method may not include an optional scanning operation prior to the item package reaching the routing destination, or such a scanner may not be able to read the box dimension bar code. In some cases, this may result in a box being directed to a shipping line that cannot handle it (e.g., one customized for a different box size/height or configured to process boxes in a different size/height range). In some embodiments, a scanner in the package routing operation may be used to attempt to read the box dimension bar code and/or to measure the height of a container immediately prior to routing the container to a particular shipping line according to the predictive routing destination, and may determine that the container cannot be handled by that shipping line. If such a determination is made, and the current routing destination is invalidated, shown as the negative exit from 410, the method may include flagging the item package for exception handling and/or further analysis, as in 425. For example, the package may be manually scanned or measured to determine a more appropriate shipping line for the package, and/or an analysis may be performed to determine why the item package was not handled in the recommended container, in some embodiments.

If the package routing operation validates the current routing destination, or if it is unable to invalidate the current routing destination (e.g., if a scanner at the package routing operation cannot read the box dimension bar code), the package routing operation may send the item package to the current routing destination associated therewith, as in 420. Using the example above, when this package arrives at the packing router, it may be routed to any shipping lane that is able to receive and process 10×7×3 inch boxes (e.g., using a sorter lane matrix control panel). As illustrated in FIG. 4, the routing destination itself may include one or more mechanisms for determining if the routing destination for the item package is valid, as in 430. Again, a box that is larger than recommended may have been used to handle a given item package and may have been directed to a shipping line that cannot handle it. In such cases, there may be systems in place at routing destinations (e.g., human intervention) to detect these errors. For example, an agent may be working in the shipping operation to add filler (e.g., bubble wrap or other dunnage, advertisements, flyers, etc.). The agent may detect that a box that is larger than can be handled by the various shipment preparation stations has been received, and may remove the item package, re-route the item package to a different shipping line, flag the item package for exception handling and/or flag the item package for further analysis, in various embodiments. This is illustrated as the negative exit from 430 to 425. On the other hand, if the routing destination is able to validate the routing destination for the item package (e.g., by determining that the shipment preparation line to which it has been routed is appropriate for the container size and/or any special handling requirements), shown as the positive exit from 430, the item package may be processed at the routing destination, as in 440.

Note that the method illustrated in FIGS. 3 and 4 for predictive routing of item packages may not achieve 100% accuracy unless the container recommendations are followed 100% of the time. In some embodiments, as discussed above, there may be various reasons that a recommended container is not used to handle a given item package. However, the initial accuracy of a predictive router that uses the output of a container recommender to determine a routing destination, as described herein, may be significantly higher than that of a router that determines routing destinations based on scans of box dimension bar codes. As described above, in some embodiments, that initial accuracy may be increased by the addition of an optional scanning operation. In one example, if container recommendations are followed 90% of the time, then only 10% of item packages may be initially associated with incorrect (e.g., inappropriate or non-optimal) routing information, as determine by the predictive router. If an optional scanner achieves a 75% read rate, then 75% of these incorrect recommendations may be corrected (i.e., 7.5% of the original set). This may bring the system accuracy to 97.5%. In another example, if recommended containers are used 90% of the time, but the read rate of box dimension bar codes is as low as 60% (e.g., if this is the read rate for the least-readable bar codes), the overall accuracy of the routing decision would be at least 96%. In this example, 10% of the item packages may be associated with incorrect routing destinations by the predictive router, but an optional scanner may detect at least 60% of those, leaving at most 40% of those 10% with incorrect routing information, or 4% of the original set.

Note that in some embodiments, the overall system may be tolerant of any remaining errors, as errors in box recommendation may typically only result in a single size change (e.g., a 12×9×4 inch box may be used where a 10×7×3 inch box was recommended, and this may be the next larger size in the box mixture available in the facility). This box recommendation error may be due to errors in item dimension/weight information or container dimension/capacity information, or due to the lack of the recommended box size at the packer's location, in various embodiments. In some embodiments, it may be very rare for a very large box to be used where a small box was called for. In addition, shipping lines that are primarily intended to process boxes of a given box size (e.g., for small boxes) may in some embodiments be configured to handle boxes that are one size larger than the targeted box size, in order to account for such errors.

Note that, in some embodiments, errors involving a larger-than-recommended box being directed to a line that cannot process it may be less likely than the reverse (errors involving a smaller-than-recommended box being directed to a line that can handle larger boxes) since box dimension bar codes on larger boxes may be easier for various scanners in the facility to read accurately. In some embodiments, the second type of error may be less disruptive than the first, as a shipping line configured to handle larger boxes may also be able to handle a smaller box, as well, while the reverse may not be true. In such embodiments, the occasional small box arriving at a shipping line configured to process larger boxes may be processed by he shipping line to which it was incorrectly directed, but it may not be processed as quickly or cost-effectively as if it had been directed to a shipping line that was specifically configured to process boxes of its size.

Note that in some embodiments, the items in an item package may be grouped by category, product line, affinity (e.g., so that fragile items are grouped together and/or separately from heavy and/or bulky items; or so that items that are required to be shipped together are grouped together), or by other parameters (e.g., volume, largest dimension, weight, or whether they will be gift wrapped), and assigned to one of several shipment sets that collectively make up the item package. In such embodiments, a box recommender and/or predictive router may be invoked to determine a single recommended container (and, thus, a single routing destination) to be used for all of the shipment sets of an item package, or to determine a different recommended container (and routing destination) for each of the shipment sets, dependent on item quantities, item types, capabilities of the materials handling facility, customer requirements, final destination constraints or capabilities, transportation constraints, and/or any other suitable parameters.

Note also that a correction may be made to an initially predicted routing destination by the predictive router based on information received by the predictive router and/or the control system that was not available when the initial prediction was made. For example, at the time that a container recommendation was made (e.g., prior to the item package reaching the sorting location), the control system may have consulted a database to determine the quantity and type of containers available in the facility and may have determined the recommended container based on the availability at that time. However, at some point subsequent to the initial determination (either before or after the item package is packed in an actual container), the control system may receive information indicating that more or fewer containers of a given type are now available, and the control system may invoke the container recommender to update the container recommendation. Note that in some embodiments, the container recommendation may be updated even if the item package has already been packed in an actual container prior to the update being made. In such embodiments, the predictive router may also be invoked so that it may be determined if the routing destination should also be updated, in response to the change in the recommended container for the item package. For example, the container recommender may have recommended a particular target container for an item package based on the containers that are usually available at the facility (or those projected to be available), but a recent change in the configuration of the facility or a problem with quality or delivery of that particular container type in the facility may have rendered the recommended container type unavailable. In another example, the container recommender may have recommended a non-optimal container for an item package based on the fact that the facility has run out of a more suitable container that is usually available at the facility (or those projected to be available), but a recent delivery of additional containers of the more suitable type may be received at the facility before the item package reaches the packing operation.

Predictive routing, as described herein, may be implemented in one or more software modules executing on one or more nodes of a computing system or using any combination of hardware and software components of a computing system, in various embodiments. For example, a predictive router may be a component of an overall facility management system, which may also include a container recommender, a routing performance analyzer, a shipment splitting analyzer, and other components suitable for tracking, managing, and/or controlling various operations of a materials handling facility. A facility management system may in some embodiments include fulfillment planning engine, configured to receive customer orders and to determine the facility or facilities to which an item package or complete customer order should be directed. A fulfillment planning engine may in some embodiments be configured to divide a customer order into multiple item packages dependent on whether or not a single fulfillment facility is able to provide all of the items in an order, or on other parameters, including, but not limited to, a service level agreement, the location of one or more facilities with respect to a destination, customer and/or order priorities (e.g., premium customer service or premium shipping considerations), specialty transportation service availability, or specialty services capability (e.g., gift wrapping or export services). A fulfillment planning engine may provide item package data for a customer order (which may include multiple item packages making up a customer order), to a control system configured to manage the operations of one or more such target facilities, in some embodiments.

Figure 5:
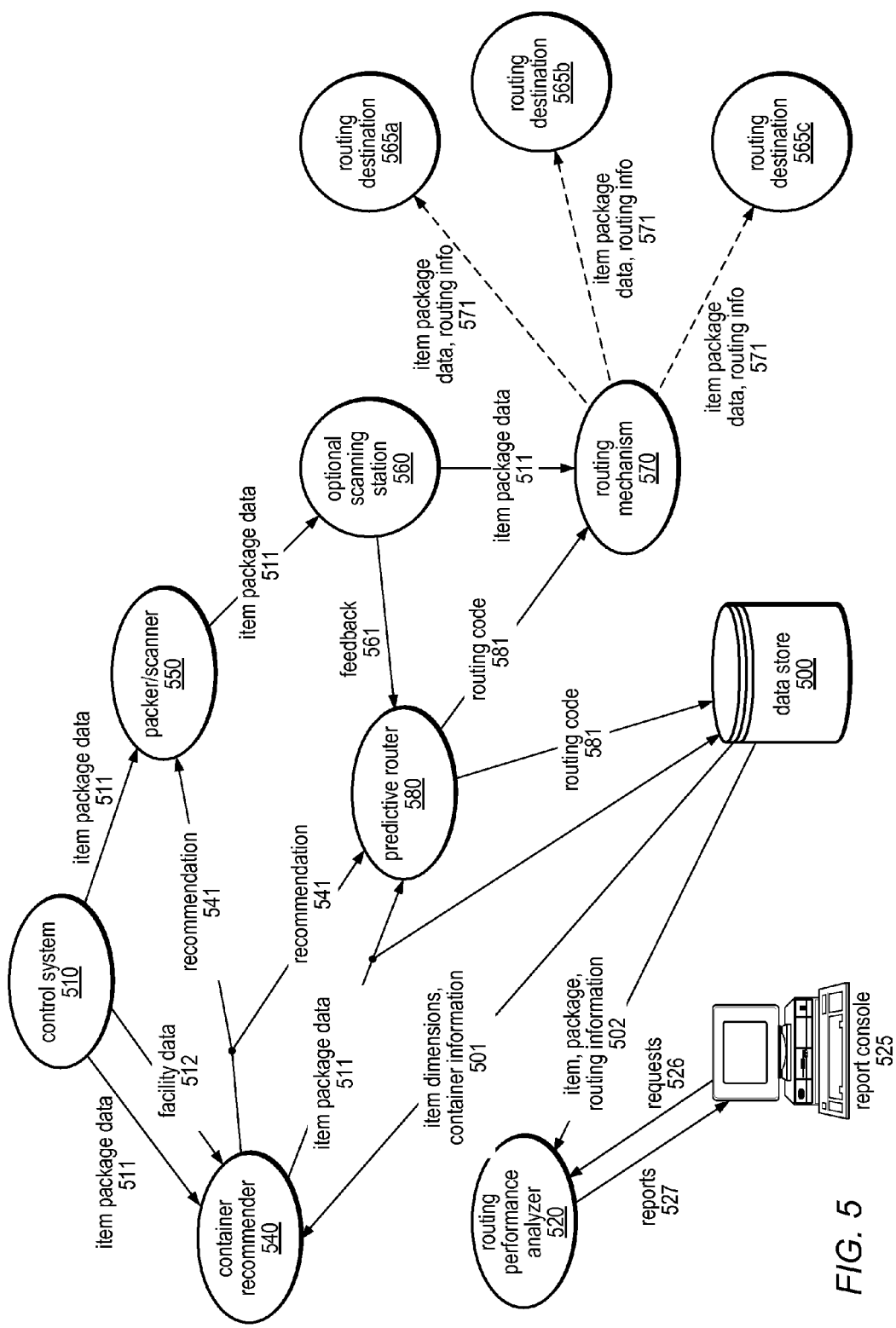
FIG. 5 illustrates a data flow diagram for a system implementing predictive routing, according to one embodiment.

Interactions between various components of a facility management system that includes a predictive router are illustrated by the data flow diagram in FIG. 5, according to one embodiment. In this example, item and container dimension and/or weight values may be stored in one or more tables, databases, or other data structures maintained in a data store 500 on one or more computing system nodes within a materials handling facility and/or on one or more remote computing system nodes configured to communicate with the operations of the materials handling facility.

As illustrated in FIG. 5, container recommender 540 may obtain item package data 511 and facility data 512 from a control system 510 (e.g., one that receives customer order information and/or item package information from an ordering operation and/or an upstream fulfillment planning engine). Item package data 511 may in various embodiments include, but is not limited to, an identifier of an item package, a list of items in the item package (e.g., item identifiers and a quantity associated with each item), a customer identifier, an order identifier, and/or special handling instructions. Facility data 512 may include, for example, a list and/or quantity of available shipping container types, facility configuration, capability, or constraint information, and/or information about services available at the target facility (e.g., gift-wrapping, co-branding, or premium shipping services). In this example, container recommender 540 may obtain item dimensions and container information 501 from data store 500. Item data 501 may include dimension information, weight information, affinity and/or relationship information, or category information associated with each item in an item package, in various embodiments. Data 501 may also include dimension, weight or capacity information for available containers. Any or all of item/container data 501, item package data 511 and facility data 512 may be used by container recommender 540 to recommend a container in which the item package may be handled.

As illustrated in FIG. 5, container recommender 540 may provide a recommendation 541 of a container suitable for handling a given item package to a packer/scanner operation 550. The recommendation 541 provided to packer/scanner operation 550 may include a packing list and an indication of a recommended container for the items on the packing list, or may include an identifier of the item package and a recommended container for the item package. In the example illustrated in FIG. 5, the packer/scanner 550 may obtain item package data 511 (which may include a packing list) from control system 510, rather than from container recommender 540. In this example, container recommender 540 may provide recommendation 541 to predictive router 580, and may also pass item package data 511 to predictive router 580 and/or to data store 500. In other embodiments, container recommender 540 may provide recommendation 541 to control system 510, and predictive router 580 may obtain item package data 511 and/or recommendation 541 from control system 510. Predictive router 580 may determine an initial routing destination for the item package (e.g., based on the recommended container and/or any special handling requirements), and may provide an indication of the routing destination (shown as routing code 581) to routing mechanism 570 and/or to data store 500, in this example. The predictive router may in some embodiments be configured to store this information in data store 500 along with an identifier of the item package and/or an identifier of the actual container (e.g., a serial number associated with the actual container when it was erected for use by the packing operation). In other embodiments, predictive router 580 may provide routing code 581 and/or an indicator of the actual container to control system 510, and other components of the facility management system may obtain routing code 581 and the container indicator from control system 510, rather than directly from predictive router 580.

Note that item package data 511 and/or recommendation 541 may in some embodiments be provided to packing/shipping operation 550 on an input/output device readable by an agent working in the materials handling facility, in some embodiments. In other embodiments, item package data 511 and/or recommendation 541 may be printed for an agent, such as on a pick list or packing list. In still other embodiments, a machine may be configured to pick and/or present a recommended container (such as a box) to an agent or to an automated packing system and/or to automatically transport the items in a given shipment set to a portal, path, or packing station (e.g., one suitable for handling containers having a particular range of dimensions and/or weight capacity) for packing, based on recommendation 541 being communicated to packer/scanner 550.

In the example illustrated in FIG. 5, the packer/scanner operation 550 may scan each item as it is packed in an actual container (which may or may not be the recommended container) and this information may be added to item package data 511 when it is passed to an optional scanning station 560. In this example, feedback 561 (which may include an indication of the actual container) may be provided to predictive router 580 (and in some embodiments to control system 510), if the optional scanning station 560 is able to scan the box dimension bar code of the actual container to determine its type and/or size, as described above. Predictive router 580 may be configured to use feedback 561 to determine if the actual container and recommended containers were the same and, if not, to determine if recommendation 541 should be updated in response to determining that the recommended container was not used. In some embodiments, the predictive router 580, and/or central control system 510, may use feedback 561, along with any other stored information corresponding to the item package, in determining whether to override the initially predicted routing destination for the item package. For example, predictive router 580 and/or central control system 510 may also take into account any special handling instructions when determining whether or not to override a predicted routing destination, in some embodiments. If predictive router 580 and/or central control system 510 determines that a different routing destination may be more appropriate for the item package, an updated routing code of the routing destination (e.g., one overriding the previously predicted routing destination) may be stored in data store 500 and/or may be communicated to routing mechanism 570 prior to the item package reaching the routing mechanism. If predictive router 580 updates the routing destination, predictive router 580 may in some embodiments also be configured to provide the updated routing code 581 to control system 510 (not shown). In the example illustrated in FIG. 5, optional scanning operation 560 may provide item package data 511 (which may include an indication of the actual container, if it was successfully determined) to routing mechanism 570, and predictive router 580 may provide routing code 581 (which may include an indication of the initial routing destination and/or an updated routing destination) to routing mechanism 570. In other embodiments, routing mechanism 570 may obtain item package data 511 from predictive router 580 (e.g., along with routing code 581) or routing mechanism 570 may obtain item package data 511 and routing code 581 from control system 510.

In some embodiments, predictive router 580 and/or optional scanning operation 560 may be configured to report any differences between actual and recommended containers for item packages to control system 510 and/or to store an indication of the difference in data store 500 for further analysis (not shown). In some embodiments, container recommendations 541 and/or feedback 561 regarding actual containers in which various item packages are shipped may be exchanged between one or more computing system nodes within a materials handling facility and/or remote computing system nodes configured to communicate with the operations of the materials handling facility (e.g., for error analysis, trend analysis, to identify best practices, etc.)

In this example, routing mechanism 570 may be configured to transport packed item packages, along with item package data and routing information 571, to a particular routing destination 565, based on recommendation 581, as described herein. For example, routing destination 565a may be a shipping line customized to efficiently prepare boxes of the smallest available size for shipping, routing destination 565b may be configured to prepare boxes of two or more larger sizes for shipping, and routing destination 565c may be configured to provide gift-wrapping services for boxes in a particular range of sizes. Note that a materials handling facility may include any number of routing destinations 565, some of which may be generic shipping lines configured to handle a wide range of container types and sizes, and others of which may be customized or configured to handle particular container types/sizes, narrower ranges of container types/sizes, and/or special handling operations (e.g. for gift-wrapping, co-branding, premium shipping, specialized transportation services, etc.) In some embodiments, routing mechanism 570 may include an automated sorting system configured to direct and/or transport packed item packages to a particular routing destination 565, based on recommendation 581, as described herein.

While the example illustrated in FIG. 5 includes an optional scanning operation 560 that may be used to override an initial predictive routing destination, other embodiments may not include this operation. In still other embodiments, a scanner may be included in routing mechanism 570, or two or more scanners may be placed in the path between the packer/scanner 550 and routing mechanism 570 to provide additional opportunities to detect misdirected item packages. Note that, in some embodiments, scanners may already be present along the path taken by packed boxes as they move through the facility toward a shipping operation. These scanners may be used for purposes other than a determination of the actual containers used to ship item packages (e.g., for monitoring materials flow, detecting jams in chutes or backups on conveyors, or for other purposes). In such embodiments, these existing scanners may be leveraged to perform the functions of optional scanning station 560 (e.g., attempting to determine the actual container used for each item package, and communicating an indication of the actual container to other operations, if successful). In other embodiments, scanners may be added to the facility to perform the functions of optional scanning operation 560 described above. Note, therefore, that in some embodiments, these optional scanning operations may add costs in terms of scanning equipment. However, in some embodiments, they may not add additional costs in terms of labor or time to the process of directing packed boxes to an appropriate shipping line, since packed boxes may be scanned as they traverse the facility during normal operation (e.g., along the same path they would otherwise take), and the container recommender 540 and predictive router 580 may perform their determinations in parallel with the normal operations of the facility.

In various embodiments, predictive router 580 and/or central control system 510 may communicate a routing code 581 (e.g., an initial or updated routing code 581), as often as necessary to reflect any additional information that may affect the routing decision. In some embodiments, various operations in the facility other than optional scanning station 560 may also provide feedback to predictive router 580 and/or control system 510 (e.g., feedback regarding the configuration of a target facility, the capabilities and available services of a target facility, the available containers of a target facility, etc.). Feedback from these operations may be received from an agent (e.g., as data entered by an agent on a terminal or other communication device), in some embodiments, or from an automated feedback mechanism of various operations of the materials handling facility. For example, in some embodiments, if a change is made to information associated with an item package after processing of that item package has begun in the facility (e.g., if a change is made to its shipping method, service level, or gift wrapping option through an order processing application), the system may be configured to accommodate that change at routing mechanism 570, or even later (e.g., at the routing destination 565). In such embodiments, control system 510 (or predictive router 580) may receive updated information associated with the item package, may store that updated information in data store 500, and may determine whether a different routing destination 565 is appropriate for the item package based on the updated information. If so, control system 510 or predictive router 580 may in some embodiments communicate an indication of the updated routing destination to the routing mechanism 570, to one or more shipment preparation operations (e.g., the predicted routing destination 565 and/or the updated routing destination 565), and/or to any other operations downstream of the item package in the facility.

As illustrated in FIG. 5, the facility management system may in some embodiments include a routing performance analyzer 520 configured to provide reports 527 in response to one or more requests 526. In this example, report console 525 may include a web browser through which a user may request various reports and on which these reports may be displayed. For example, a user may request and receive one or more reports regarding the number or percentage of item packages that are shipped in each container type/size, the number or percentage of item packages that are (or are not) shipped in the recommended container, the number or percentage of item packages for which the initially predicted routing destination was updated, the number or percentage of boxes for which an actual box type/size was determined, the number of boxes misdirected to a customized shipping line that cannot handle the misdirected boxes, the number of boxes misdirected to a generic or non-optimal shipping line that could have been more efficiently handled by a different shipping line, the throughput of a given shipping line or of the overall packing/shipping operations, the number or percentage of container recommendations determined to be invalid, inappropriate, or non-optimal, or the reasons that container recommendations were invalid, inappropriate, or non-optimal. In some embodiments, trends of each of these metrics may be reported and/or analyzed in order to identify opportunities to improve the container recommender, predictive router, or other operations within the facility and/or the configuration or policies of a given materials handling facility. For example, if one of these metrics changes by a given percentage (up or down), the control system may be configured to flag the change and/or to trigger a review of the performance of the facility management system or the operation of a given facility.

While the embodiment illustrated by FIG. 5 includes a container recommender 540, a predictive router 570, a control system 510, and a routing performance analyzer 520 that are separate components of a system configured to manage various operations in the facility, in other embodiments, the functionality described as being performed by each of these components may all be performed by sub-components of a single system component, or may be partitioned in other ways. For example, in one embodiment, container recommender 540 may be implemented as a module of a software application configured to implement predictive router 580, or vice versa. In another example, data store 500 may be located in a memory of the same computing node or of a different computing node than a memory that includes program instructions configured to implement predictive router 580 and/or container recommended 540. For example, in some embodiments, the facility management system may include a remote data store, such as a data store located at a headquarters of a company operating the materials handling facility. In some embodiments, metrics may be provided by data store 500 to such a remote data store concerning the operations of the materials handling facility. These metrics may include item, package, and routing information 502, container usage data, report data 527, and other data collected and/or collated by the facility management system. Metrics that may be extracted from data store 500 may be analyzed and compared to similar metrics received by a remote data store from other materials handling facilities, in some embodiments. For example, these metrics may be used to identify best practices at one or more materials handling facilities.

In some embodiments, the facility management system may include a package performance analyzer (not shown). In some embodiments, a package performance analyzer may be configured to determine the costs associated with the operations described herein, e.g., the cost of the containers recommended and/or used, the utilization of generic vs. customized shipping lines, and the achieved throughput of the shipping lines. A package performance analyzer may in some embodiments be configured to generate reports regarding the cost performance of the facility and/or to determine recommended changes in policies and/or the configuration of the facility that may improve that performance (e.g., a change in the configuration of one or more shipping lines for more efficient handling of particular container types/sizes through customization). In some embodiments, the data included in these reports may be sorted by time/date or time/date range, by customer, by item package identifiers, by container type/size, by location, by site, by facility, by process path, and/or by agent. The information in the reports may be presented in terms of raw data (e.g., a count of each event being reported), or as a percentage or trend of events being reported, in different embodiments. In other embodiments, other types of packaging performance reports that may be useful in assessing and improving the operations of a materials handling facility may be generated by the package performance analyzer based on the information accessible to the package performance analyzer.

Figure 6:
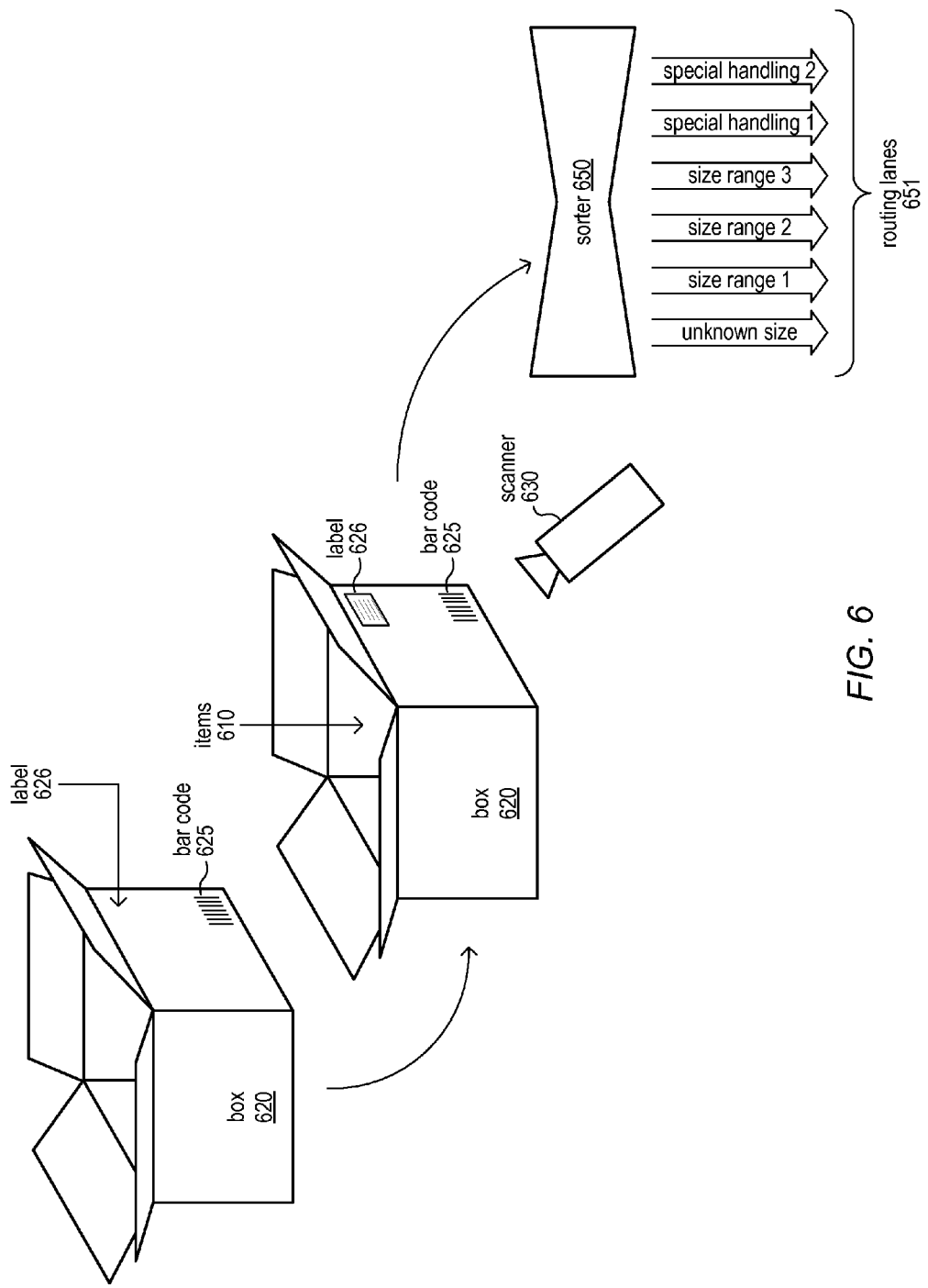
FIG. 6 illustrates a materials flow diagram for a system implementing predictive routing, according to one embodiment.

The system and method for predictive routing described herein may be further illustrated using the materials flow diagram in FIG. 6. In this example, a corrugated box 620 may be erected for use by a packing operation, such as packing operation 160 of FIG. 1 or packer/scanner 550 of FIG. 5. As described herein, each container used in the facility may be pre-printed with an identifier of the container type and/or size. This is illustrated in FIG. 6 as bar code 625, which may be a box dimension bar code, in some embodiments. As previously noted, in some embodiments, when a container is erected for use by the packing operation (when a flattened corrugated box is assembled for use), a unique serial number may be associated with that container. In some embodiments, a label printed with the associated serial number may be applied to the container when it is assembled and this label (e.g., a unique box label) may be used to track the item package that is subsequently handled in the container. This is illustrated in FIG. 6 as the application of label 626 to box 620. The unique box label 626 may in some embodiments be printed using a high quality printing process and/or on a high-contrast, highly uniform material, such that the read-rate for this label is extremely high (e.g., 98% or more, in some embodiments).

In the example illustrated in FIG. 6, after label 626 has been applied to box 620, it may be available for use in a packing operation. Note that in some embodiments, agents may be directed not to pack items in any container that does not include a unique box label 626. FIG. 6 illustrates the addition of items 610 to box 620. In one embodiment, when box 620 is packed, the unique box label 626, an identifier of the item package (e.g., a printed or electronic list of the items in the item package), and/or all items 610 placed in box 620 may be scanned by a packing agent to associate the item package and/or items with the unique serial number of the box 620 in which they are packed. Some or all of this information may in some embodiments be stored in a data store in the materials handling facility (e.g., data store 500) or in a remote location (e.g., in a database, table, or other data structure accessible by various operations in the materials handling facility), and may be consulted by a predictive router when determining an appropriate routing destination for box 620.

As described above, in some embodiments, box 620 may be conveyed to a routing mechanism (illustrated in FIG. 6 as sorter 650) that sorts packed boxes according to their routing destination (e.g., to a shipping line configured to process boxes of a given type/size or within a given type/size range). As box 620 is conveyed to the routing mechanism, it may pass a scanner, shown in FIG. 6 as scanner 630, which may be used to attempt to determine the actual type/size of box 620. For example, scanner 630 may be positioned so that an attempt may be made to scan bar code 625 on the side of box 620. As described above, if scanner 630 is able to read bar code 625, it may provide an indication of the box type/size to a predictive router and/or control system, which may update a routing destination for the box in response.

The routing mechanism may in some embodiments include automated sorting equipment (e.g., Crisplant® or Eurosort® sorters), configured to sort packed boxes according to their routing destinations and to divert them to one of two or more conveyors, chutes, channels, tubes, shafts, or other portals to their destinations. This is illustrated in FIG. 6 as sorter 650 diverting box 620 to one of routing lanes 651. In other embodiments, the routing mechanism may receive instructions from a predictive router and/or control system and/or provide instructions for agents to perform manual or semi-automated sorting of packed boxes. For example, the routing mechanism may include a terminal, display, or printer configured to present an agent with an indication of the routing destination for each box expected to arrive at a sorting or routing station associated with the routing mechanism. In this example, the agent may divert box 620 to one of routing lanes 651 according to the indication of the routing destination present to them. In the example illustrated in FIG. 6, some of the routing lanes 651 are configured to convey boxes to a particular shipping line dependent on the size of the boxes and/or on special handling instructions. In this example, three of the routing lanes 651 are size-based, two are specific to various special handling options, and one of the routing lanes 651 may be used to route all other boxes (e.g., boxes of unknown size, boxes of a size for which no shipping lines are customized, and/or boxes that require some type of exception handling).

While the example illustrated in FIG. 6 includes a scanner 630 that is separate from the routing mechanism (e.g., sorter 650), in other embodiments, scanner 630 may be a component of the routing mechanism. In such embodiments, the routing mechanism may receive a packed box 620 and may scan its unique box label 626. The routing mechanism may retrieve information corresponding to the unique box label 626 from the data store (or from a local data store to which this information has been transmitted by the control system) to obtain an indication of the routing destination that was determined by the predictive router. In some embodiments, the routing mechanism may also obtain item information and/or item package information associated with the unique box label 626 from the data store. The routing mechanism may direct the item package, packed in box 620, to a respective routing lane 651, according to the indication of the routing destination. In some embodiments, the routing mechanism may receive information indicating the item packages to expect (e.g., as identified by their unique box labels 626), and their respective routing destinations, prior to receiving the item packages themselves.

In some embodiments, a predictive router may be a component of a comprehensive facility management system or a packaging information service. Such a system or service may include additional components configured to provide other functionality to various operations in the materials handling facility. For example, the system or service may include any or all of the following:

- a box forecasting service, configured to generate a report specifying what containers (e.g., boxes) to erect, and when to erect them, so that they are delivered to a packing operation at the same time as the items.
- a package type recommender, configured to recommend a packaging type based on shipment weight or product types to reduce damage in shipping. For example, stronger corrugate may be recommended for heavier product or a fragile item may be directed to a box rather than a folder.
- a shipping method recommender, configured to assign shipment methods dependent on box type availability and the resulting cost of shipment.
- a filler recommender, configured to recommend a number of air bags for a container, for example.
- an inbound prepping service, configured to use a container recommendation for prepping of inbound items.
- a packaging system flow analyzer, configured to display a tradeoff in packaging choice versus productivity in real time. For example, if a package choice is optimum, but a corresponding productivity impact negates savings, the analyzer may recommend a choice to be made.
- an automated inventory cycle counter, configured to decrement consumables used in packing/shipping operations. This may reduce manual cycle count errors, and account for wastage.
- a financial analyzer, configured to offer comparison data for supplies cost from container usage reports to manual cycle count usage data.
- a new merchant shipping cost forecaster, configured to determine a real shipping cost impact of new merchant integration to replace fixed estimates.
- a customer container advisor, configured to determine the number of boxes a customer should expect for an order and to display this at checkout.
- a process path recommender, configured to direct particular item packages to process paths in which recommended containers are available.

The methods used by a facility management system for predictive routing are not intended to be limited to those described above and/or illustrated in FIGS. 3-6, and may include any other algorithms suitable for determining how and where to route a given item package within a materials handling facility, according to different embodiments. For example, a predictive router may use different policies and/or parameters to determine a routing destination for a given item package and/or to apply received feedback to validating and/or updating the predicted routing destination, in different embodiments. While the predictive router has been described herein primarily in terms of its application to the routing of packed boxes to a particular shipping line in a materials handling facility, a predictive router may also be applied to the routing of individual items or groups of items being handled in containers for transportation within the facility (e.g., between any two operations of the facility). For example, one or more sorting stations 150 may be configured to accommodate the sorting of large items and/or large groups of items, and a predictive router may be used to determine a sorting station 150 to which a group of picked items should be directed for sorting into item packages, dependent on a container recommended for transporting them from a picking operation 140 to the sorting station 150 (e.g., a tote, cart, crate, box, or pallet of a particular type/size).

In some embodiments, a predictive router may be used to direct a group of items to another building or another facility. For example, items may be received from vendors at a building or facility that does not ship items directly to customers and those items may need to be routed to another building or facility in order to process them for shipping (e.g., to store, sort, pack, and/or ship the items for one or more item packages or customer orders). In such embodiments, a predictive router may be used to route a group of items (e.g., a mix of items received at the first building or facility) to another building or facility dependent on a container recommended for transporting the group of items to another building or facility. For example, one building or facility may include storing, sorting, packing, and/or shipping operations configured to handle large items, and the predictive router may determine that the predicted routing destination for a given item package should be this building or facility if the container recommended for the item package is a large container. In other words, the predictive router may be configured to predict that at least some of the items in the container are large ones, based on the recommendation of a large container to transport them to another building or facility, and may route the items to a facility configured to handle large items. The predictive router may also be configured to route a group of unrelated items (e.g., a mix of items that are not necessarily for a single item package or a single customer order) to another building or facility dependent on a container recommended to transport them from a building or facility that includes a receiving or staging operation to a building or facility in which the items will be stored, sorted, packed and/or prepared for shipping. Again, the predictive router may predict that a particular facility may be well suited to handle the items dependent on the size of the recommended container. For example, if the recommended container is large, the items may be routed to a facility that is configured to handle large items and/or large item packages, and if the recommended container is small (e.g., if one of the dimensions of the container is less than a given threshold), the items may be routed to a facility that is configured to more efficiently handle small items and/or small item packages, as described herein.

A facility management system, or stand-alone predictive router, may be implemented within the facility in one or more software modules executing on one or more nodes of a computing system (e.g., as program instructions and data structures configured to implement functionality described herein), or in any combination of hardware and software components suitable for implementing functionality described herein. It may be configured to receive inputs from other software applications, agents working in the facility or remotely, and/or automated systems within the facility (e.g., scanners, sensors, automated storing, picking, or packing equipment, or software applications managing one or more local or remote data stores.) For example, when an item package is placed in a container for shipping, a container identifier (e.g., unique serial number identifier) and an item package identifier may automatically be scanned, or these identifiers may be input by a packing agent using a terminal or other suitable input device. In addition, an identifier of the packing station and/or agent responsible for packing the item package for shipping may be automatically captured or manually input. Any or all of this information, along with other information received from and/or stored by other operations in the materials handling facility may serve as inputs to the facility management system.

Figure 7:
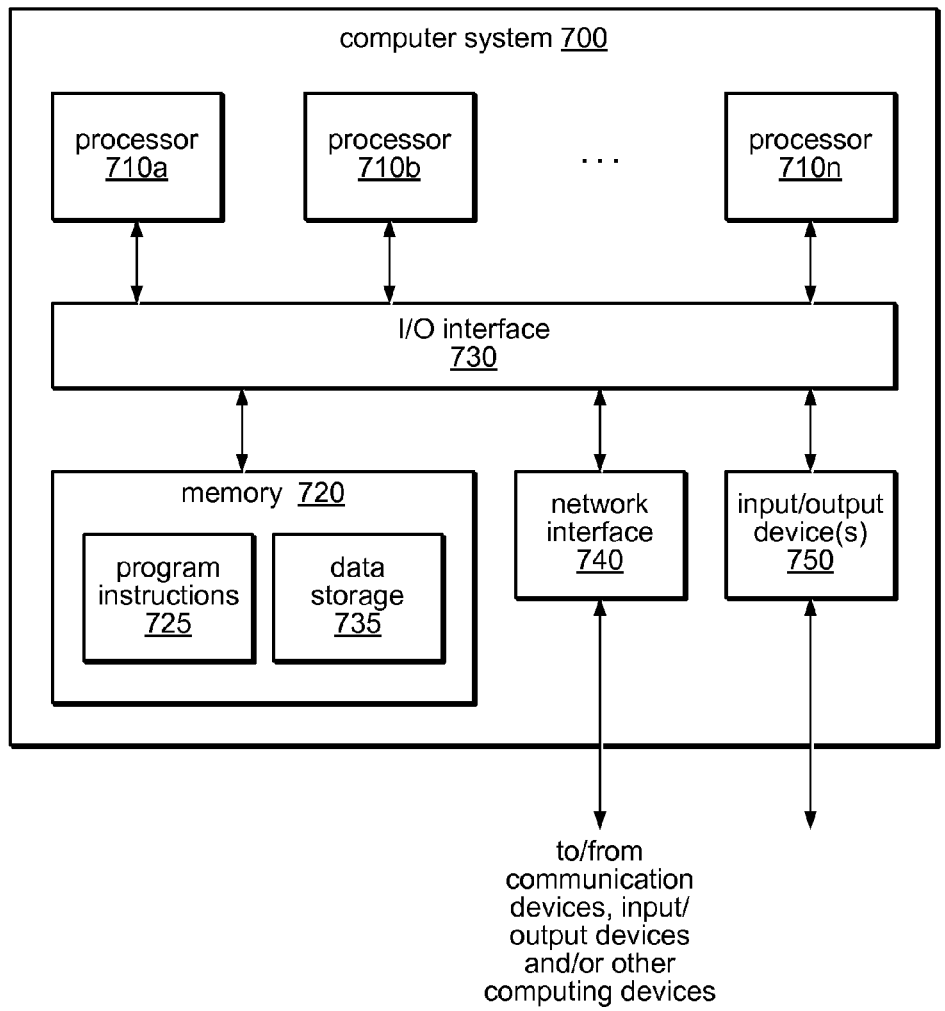
FIG. 7 is a block diagram illustrating an exemplary embodiment of a computer system suitable for implementing predictive routing.

Predictive routing, container recommending, and/or a facility management system, as described herein, may be executed on one or more computer systems, interacting with various other devices in a materials handling facility, according to various embodiments. One such computer system is illustrated by FIG. 7. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750. In some embodiments, it is contemplated that a predictive router, a container recommender, and/or other components of a facility management system may be implemented using a single instance of computer system 700, while in other embodiments multiple such systems, or multiple nodes making up computer system 700, may be configured to host different portions or instances of a predictive router, a container recommender, and/or a facility management system. For example, in one embodiment some data sources or services (e.g., capturing container information for an item package) may be implemented via one or more nodes of computer system 700 that are distinct from those nodes implementing other data sources or services (e.g., recommending a container for an item package, or predicting a routing destination for an item package). In some embodiments, a given node may implement the functionality of more than one component of a predictive router, a container recommender, and/or a facility management system.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 7, memory 720 may include program instructions 725, which may be configured to implement a predictive router, a container recommender, and/or a facility management system, and data storage 735, which may comprise various tables, databases and/or other data structures accessible by program instructions 725. In one embodiment, program instructions 725 may include various software modules configured to implement a predictive router, such as that described in conjunction with FIGS. 3-4 and/or a facility management system, as described in conjunction with FIG. 5. In some embodiment, program instructions 725 may include one or more software modules configured to implement a container recommender (such as container recommender 540 described above) and/or a routing performance analyzer (such as routing performance analyzer 520). Program instructions 725 may also include program instructions suitable for interacting with data store 500 (e.g., to store and/or retrieve data from the data store) and/or report console 525. In various embodiments, program instructions 725 may include software modules configured to implement any of the functionality described herein for comprehensive facility management system.

As noted above, data storage 735 may include one or more tables, databases, or other data structures used for storing and retrieving various parameter values used in conjunction with the system and methods described herein. For example, data storage 735 may include various data stores for maintaining item parameter values, container parameter values, item package information (e.g., list of items making up an item package, special handling instructions for item packages, etc.), facility configuration information, customer preference information, order information, and various reports produced by the routing performance analyzer and/or other components of a facility management system. Item parameter values may include an identifier, a weight, a volume, a length, a height, a width, a suspect dimensions count, or a confidence level value, as well as item names, quantities, descriptions, pricing, cost, or any other information that may be included in a product catalog, inventory management system, or other representation of the items in the materials handling facility, in various embodiments. Container parameters may include container identifiers, names, and dimensions, as well as weight, weight capacity, color, composition, quantity, supplier name, or any other information about containers that may be useful to the various operations of the materials handling facility. In various embodiments, item package information may also include information about containers used in shipping each item package and/or shipment set thereof, and may also include recommended containers for each item package and/or shipment set. In various embodiments, any or all of the data and/or tables described herein may be included data storage 735.

In various embodiments, the parameter values and other data illustrated herein as being included in one or more data stores may be combined with other information not described or may be partitioned differently into more, fewer, or different data structures. In some embodiments, data stores used in predictive routing and/or in a facility management system, or portions thereof, may be physically located in one memory or may be distributed among two or more memories. These memories may be part of a single computer system or they may be distributed among two or more computer systems, such as two computer systems connected by a wired or wireless local area network, or through the Internet, in different embodiments. Similarly, in other embodiments, different software modules and data stores may make up a predictive router and/or a facility management system.

Users may interact with the predictive router and/or facility management system in various ways in different embodiments, such as to input an update to a customer order, item package data, facility data, item or container parameter values, or special handling instructions, or to specify reports to be generated and/or report parameters. For example, some users may have physical access to computing system 700, and if so may interact with various input/output devices 750 (e.g., report console 525) to provide and/or receive information. Alternatively, other users may use client computing systems to access the predictive router and/or package performance analyzer, such as remotely via network interface 740 (e.g., via the Internet and/or the World Wide Web). In addition, some, or all, of the predictive router and/or facility management system components may provide various feedback or other general types of information to users (e.g., in response to user requests) via one or more input/output devices 750.

Those skilled in the art will appreciate that computing system 700 is merely illustrative and is not intended to limit the scope of embodiments. In particular, the computing system and devices may include any combination of hardware or software that can perform the indicated functions, including computers, network devices, internet appliances, PDAs, wireless phones, pagers, etc. Computing system 700 may also be connected to other devices that are not illustrated, or instead may operate as a stand-alone system. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via intercomputer communication. Some or all of the system components or data structures may also be stored (e.g., as instructions or structured data) on a computer-accessible medium or a portable article to be read by an appropriate drive, various examples of which are described above. Various embodiments may further include receiving, sending or storing instructions and/or data implemented in accordance with the foregoing description upon a computer-accessible medium.

Accordingly, different embodiments may be practiced with other computer system configurations.

Those skilled in the art will appreciate that in some embodiments the functionality provided by the methods discussed above may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered. The various methods as illustrated in the figures and described herein represent exemplary embodiments of methods. The methods may be implemented in software, in hardware, or in a combination thereof in other embodiments. Similarly, the order of any method may be changed, and various elements may be added, reordered, combined, omitted, modified, etc., in other embodiments.

From the foregoing it will be appreciated that, although specific embodiments have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer accessible storage medium, other aspects may likewise be so embodied.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computing system, comprising one or more computing nodes, each of which comprises at least one processor and memory;

wherein the one or more computing nodes are configured to implement a predictive router configured to:

receive an indication of a type of container recommended to handle an item package in a materials handling facility, wherein the item package is associated with an item package identifier;

determine a predicted routing destination for the item package dependent, at least in part, on the recommended container type;

provide an indication of the predicted routing destination to a routing mechanism in the materials handling facility prior to the item package reaching the routing mechanism.

2. The system of claim 1, wherein the predicted routing destination is a shipment preparation line configured to process item packages shipped in containers of the recommended container type.

3. The system of claim 1, wherein the routing mechanism comprises an automated routing system, and wherein said providing comprises providing the indication of the predicted routing destination for the item package to the automated routing system.

4. The system of claim 1, further comprising a memory accessible by the routing mechanism and configured to store the item package identifier and to associate the item package identifier with the predicted routing destination.

5. The system of claim 1, further comprising a memory accessible by the routing mechanism and configured to store the item package identifier and to associate the item package identifier with the recommended container type.

6. The system of claim 1, wherein the predictive router is further configured to:

receive an indication of a container type of an actual container in which the item package is being handled; and determine if the item package is being handled in a container of the recommended container type.

7. The system of claim 6, further comprising one or more input devices coupled to the one or more computing nodes;

wherein said receiving an indication of the container type of the actual container comprises receiving an identifier of the actual container from the one or more input devices.

8. The system of claim 6, wherein in response to determining that the item package is not being handled in a container of the recommended container type, the predictive router is further configured to:

determine an updated routing destination for the item package dependent, at least in part, on the indication of the container type of the actual container; and provide an indication of the updated routing destination to the routing mechanism prior to the item package reaching the routing mechanism.

9. The system of claim 8, wherein said providing an indication of the updated routing destination comprises storing the updated routing destination in a memory accessible by the routing mechanism and associating the updated routing destination with the item package.

10. The system of claim 6, wherein in response to determining that the item package is not being handled in a container of the recommended container type, the predictive router is further configured to store the indication of the container type of the actual container in a memory and to associate the indication of the container type of the actual container with the item package.

11. The system of claim 6, wherein in response to determining that the item package is not being handled in a container of the recommended container type, the predictive router is further configured to flag the item package for exception handling.

12. The system of claim 1, wherein the predictive router is further configured to:

attempt to determine a container type of an actual container in which the item package is handled; and in response to a failure to determine the container type of the actual container, maintaining the predicted routing destination for the item package.

13. The system of claim 1, wherein the predictive router is further configured to:
receive feedback from the predicted routing destination indicating that the item package cannot be processed at the predicted routing destination; and
determine a different routing destination for the item package, wherein the different routing destination comprises an exception handling mechanism for misdirected item packages.

14. The system of claim 1, wherein the predictive router is further configured to:
receive feedback from the predicted routing destination indicating that the item package cannot be processed at the predicted routing destination and comprising an indication of a container type of an actual container in which the item package is being handled; and
determine a different routing destination for the item package, wherein the different routing destination is a shipment preparation line configured to process item packages shipped in containers of the container type of the actual container.

15. The system of claim 1, wherein said determining a predicted routing destination for the item package is further dependent on special handling instructions associated with the item package.

16. The system of claim 1,
wherein the one or more computing nodes are further configured to implement a routing performance analyzer configured to:
receive a request for a routing performance report;
access a data store to obtain routing related data; and
generate the routing performance report dependent on the routing related data;
wherein the routing related data comprises one or more of: a recommended container type associated with one or more item packages, an actual container type associated with one or more item packages, a routing destination associated with one or more item packages, an updated routing destination associated with one or more item packages, special handling instructions associated with one or more item packages, and a list of items associated with one or more item packages; and
wherein the routing performance report comprises one or more of: a number, percentage, or trend of item packages shipped in containers of a given container type; a number, percentage, or trend of item packages shipped in a container of a recommended container type; a number, percentage, or trend of item packages for which a predicted routing destination was updated; a number, percentage, or trend of item packages for which an actual container type was determined; a number, percentage, or trend of misdirected item packages; a throughput of a shipment preparation line; and a number, percentage, or trend of item packages for which a container type recommendation was determined to be incorrect.

17. The system of claim 1, wherein the one or more computing nodes are further configured to implement a container recommender configured to recommend a container type for an item package dependent on item dimension values or weight values currently associated with each item in the item package.

18. A method, comprising:
performing by a computer:
receiving an indication of a type of container recommended to handle an item package in a materials handling facility, wherein the item package is associated with an item package identifier;
determining a predicted routing destination for the item package dependent, at least in part, on the recommended container type;
providing an indication of the predicted routing destination to a routing mechanism in the materials handling facility prior to the item package reaching the routing mechanism.

19. The method of claim 18, wherein the predicted routing destination is a shipment preparation line configured to process item packages shipped in containers of the recommended container type.

20. The method of claim 18, further comprising:
storing the item package identifier in a memory accessible by the routing mechanism; and
associating the item package identifier with the predicted routing destination in the memory.

21. The method of claim 18, further comprising:
receiving an indication of a container type of an actual container in which the item package is being handled;
determining if the item package is being handled in a container of the recommended container type; and
in response to determining that the item package is not being handled in a container of the recommended container type:
determining an updated routing destination for the item package dependent, at least in part, on the indication of the container type of the actual container; and
providing an indication of the updated routing destination to the routing mechanism prior to the item package reaching the routing mechanism.

22. The method of claim 21, further comprising, in response to determining that the item package is not being handled in a container of the recommended container type, flagging the item package for exception handling.

23. The method of claim 18, further comprising:
attempting to determine a container type of an actual container in which the item package is handled; and
in response to a failure to determine the container type of the actual container, maintaining the predicted routing destination for the item package.

24. The method of claim 18, further comprising:
receiving feedback from the predicted routing destination indicating that the item package cannot be processed at the predicted routing destination; and
determining a different routing destination for the item package.

25. The method of claim 18, wherein said determining a predicted routing destination for the item package is further dependent on special handling instructions associated with the item package.

26. The method of claim 18, further comprising:
receiving a request for a routing performance report;
accessing a data store to obtain routing related data; and
generating the routing performance report dependent on the routing related data;
wherein the routing related data comprises one or more of: a recommended container type associated with one or more item packages, an actual container type associated with one or more item packages, a routing destination associated with one or more item packages, an updated routing destination associated with one or more item packages, special handling instructions associated with one or more item packages, and a list of items associated with one or more item packages; and wherein the routing performance report comprises one or more of: a number, percentage, or trend of item packages shipped in containers of a given container type; a number, percentage, or trend of item packages shipped in a container of a recommended container type; a number, percentage, or trend of item packages for which a predicted routing destination was updated; a number, percentage, or trend of item packages for which an actual container type was determined; a number, percentage, or trend of misdirected item packages; a throughput of a shipment preparation line; and a number, percentage, or trend of item packages for which a container type recommendation was determined to be incorrect.

27. The method of claim 18, further comprising, prior to said receiving:
 determining a recommended type of container for the item package dependent on item dimension values or weight values currently associated with each item in the item package; and
 storing an indication of the recommended container type in a data store;
 wherein said receiving comprises obtaining the indication of the recommended container type from the data store.

28. A non-transitory, computer-readable storage medium storing program instructions that when executed on one or more computers cause the one or more computers to perform:
 receiving an indication of a type of container recommended to handle an item package in a materials handling facility, wherein the item package is associated with an item package identifier;
 determining a predicted routing destination for the item package dependent, at least in part, on the recommended container type;
 providing an indication of the predicted routing destination to a routing mechanism in the materials handling facility prior to the item package reaching the routing mechanism.

29. The storage medium of claim 28, wherein the predicted routing destination is a shipment preparation line configured to process item packages shipped in containers of the recommended container type.

30. The storage medium of claim 28, wherein when executed on the one or more computers the program instructions further cause the one or more computers to perform:
 storing the item package identifier in a memory accessible by the routing mechanism; and
 associating the item package identifier with the predicted routing destination in the memory.

31. The storage medium of claim 28, wherein when executed on the one or more computers the program instructions further cause the one or more computers to perform:
 receiving an indication of a container type of an actual container in which the item package is being handled;
 determining if the item package is being handled in a container of the recommended container type; and
 in response to determining that the item package is not being handled in a container of the recommended container type:
  determining an updated routing destination for the item package dependent, at least in part, on the indication of the container type of the actual container; and
  providing an indication of the updated routing destination to the routing mechanism prior to the item package reaching the routing mechanism.

32. The storage medium of claim 31, wherein when executed on the one or more computers the program instructions further cause the one or more computers to perform, in response to determining that the item package is not being handled in a container of the recommended container type, flagging the item package for exception handling.

33. The storage medium of claim 28, wherein when executed on the one or more computers the program instructions further cause the one or more computers to perform:
 attempting to determine a container type of an actual container in which the item package is handled; and
 in response to a failure to determine the container type of the actual container, maintaining the predicted routing destination for the item package.

34. The storage medium of claim 28, wherein when executed on the one or more computers the program instructions further cause the one or more computers to perform:
 receiving feedback from the predicted routing destination indicating that the item package cannot be processed at the predicted routing destination; and
 determining a different routing destination for the item package.

35. The storage medium of claim 28, wherein said determining a predicted routing destination for the item package is further dependent on special handling instructions associated with the item package.

36. The storage medium of claim 28, wherein when executed on the one or more computers the program instructions further cause the one or more computers to perform:
 receiving a request for a routing performance report;
 accessing a data store to obtain routing related data; and
 generating the routing performance report dependent on the routing related data;
 wherein the routing related data comprises one or more of: a recommended container type associated with one or more item packages, an actual container type associated with one or more item packages, a routing destination associated with one or more item packages, an updated routing destination associated with one or more item packages, special handling instructions associated with one or more item packages, and a list of items associated with one or more item packages; and
 wherein the routing performance report comprises one or more of: a number, percentage, or trend of item packages shipped in containers of a given container type; a number, percentage, or trend of item packages shipped in a container of a recommended container type; a number, percentage, or trend of item packages for which a predicted routing destination was updated; a number, percentage, or trend of item packages for which an actual container type was determined; a number, percentage, or trend of misdirected item packages; a throughput of a shipment preparation line; and a number, percentage, or trend of item packages for which a container type recommendation was determined to be incorrect.

37. The storage medium of claim 28, wherein when executed on the one or more computers the program instructions further cause the one or more computers to perform, prior to said receiving:
 determining the recommended type of container for the item package dependent on item dimension values or weight values currently associated with each item in the item package; and
 storing an indication of the recommended container type in a memory;
 wherein said receiving comprises obtaining the indication of the recommended container type from the memory.

* * * * *